US011386865B2

(12) United States Patent
Wang et al.

(10) Patent No.: US 11,386,865 B2
(45) Date of Patent: Jul. 12, 2022

(54) METHOD FOR CHANGING STATES OF ELECTROCHROMIC FILM

(71) Applicant: FURCIFER INC., Fremont, CA (US)

(72) Inventors: Jian Wang, Fremont, CA (US); Yan Zhou, Fremont, CA (US)

(73) Assignee: FURCIFER INC., Fremont, CA (US)

( * ) Notice: Subject to any disclaimer, the term of this patent is extended or adjusted under 35 U.S.C. 154(b) by 254 days.

(21) Appl. No.: 16/747,353

(22) Filed: Jan. 20, 2020

(65) Prior Publication Data

US 2020/0226999 A1 Jul. 16, 2020

Related U.S. Application Data

(63) Continuation-in-part of application No. 15/913,669, filed on Mar. 6, 2018, now Pat. No. 10,539,851.

(51) Int. Cl.
*G09G 3/38* (2006.01)
*G02F 1/1516* (2019.01)
*G02F 1/15* (2019.01)

(52) U.S. Cl.
CPC ............. *G09G 3/38* (2013.01); *G02F 1/1516* (2019.01); *G02F 2001/164* (2019.01)

(58) Field of Classification Search
CPC ... G09G 3/38; G02F 1/1516; G02F 2001/164; G02F 2201/58; G02F 1/157; G02F 1/163
USPC ........................................................ 359/265
See application file for complete search history.

(56) References Cited

U.S. PATENT DOCUMENTS

| | | | |
|---|---|---|---|
| 5,138,481 A | 8/1992 | Demiryont | |
| 5,365,365 A | 11/1994 | Ripoche et al. | |
| 8,004,739 B2 | 8/2011 | Letocart | |
| 8,018,644 B2 | 9/2011 | Gustavsson et al. | |
| 11,175,178 B2 * | 11/2021 | Brown ................. | G01J 1/0474 |
| 2004/0120867 A1 | 6/2004 | Dahms et al. | |
| 2004/0150867 A1 * | 8/2004 | Lee ....................... | G02F 1/1524 |
| | | | 359/273 |
| 2016/0202590 A1 | 7/2016 | Ziebarth et al. | |
| 2017/0298682 A1 | 10/2017 | Wang et al. | |
| 2018/0059498 A1 * | 3/2018 | Coffin ................... | H02M 3/04 |
| 2019/0317458 A1 * | 10/2019 | Shrivastava .......... | E06B 9/24 |

FOREIGN PATENT DOCUMENTS

| | | |
|---|---|---|
| CN | 101707892 A | 5/2010 |
| CN | 103197482 A | 7/2013 |

OTHER PUBLICATIONS

Search Report for European Application No. 19160709.2 dated Jul. 12, 2019, 11 pages.

* cited by examiner

*Primary Examiner* — Mohammed A Hasan

(57) ABSTRACT

The disclosure relates generally to a method of changing an optical state of an electrochromic film. The electrochromic film may have a plurality of optical states. The method may include selecting a desired state of the plurality of optical states; injecting electric charges into the electrochromic film; monitoring an amount of the electric charges injected into the electrochromic film; and stopping injecting the electric charges when the electric charges reaches a pre-set amount corresponding to the desired state.

16 Claims, 20 Drawing Sheets

METHOD FOR CHANGING STATES OF ELECTROCHROMIC FILM

CROSS-REFERENCE TO RELATED APPLICATIONS

This application is a Continuation-in-Part of U.S. patent application Ser. No. 15/913,669, filed on Mar. 6, 2018, which is incorporated herein by reference in its entirety.

TECHNICAL FIELD

The present disclosure relates generally to electrochromic films, and in particular, to methods for changing states of electrochromic films.

BACKGROUND

Electrochromism is a phenomenon displayed by some materials of reversibly changing optical properties by using bursts of charges to cause electrochemical redox (reduction and oxidation) reactions in electrochromic materials. The optical properties may include transmittance, reflectance, absorptance, emittance, and color. In particular, electrochromic materials exhibit reversible color changes. The optical state of an electrochromic material depends on the amount of charge injected or extracted. The optical state of an electrochromic film may refer to lightness, transparency, color, reflectance, etc. The electrochromic film's optical state could be set at any state by controlling the amount of charges. In an application of smart windows, electrochromic films are integrated with the glass window to become serviceable. Electric controllers are used to control the electrochromic films integrated with glass windows (i.e., smart windows). Additionally, a color of the electrochromic films may change based on a change in the transmittance of the electrochromic films, or degrade or change over time as a result of electrochemical cycling.

In this disclosure, we propose different methods for changing optical states of electrochromic materials such as electrochromic films. We further propose different devices and methods for adjusting a color of smart windows comprising the electrochromic materials, for example, to compensate for a change in the transmittance of the electrochromic films, or electrochromic cycling. We further propose different devices and methods of supplying power to a controller of the smart windows while determining a transmittance of the electrochromic films.

SUMMARY

One aspect of the present disclosure is directed to a method of changing an optical state of an electrochromic film. The electrochromic film may have a plurality of optical states. The method may include selecting a desired state of the plurality of optical states; injecting electric charges into the electrochromic film; monitoring an amount of the electric charges injected into the electrochromic film; and stopping injecting the electric charges when the electric charges reaches a pre-set amount corresponding to the desired state.

Another aspect of the present disclosure is directed to another method of changing an optical state of an electrochromic film. The electrochromic film may have a plurality of optical states. The method may include selecting a desired state of the plurality of optical states; extracting electric charges from the electrochromic film; monitoring an amount of the electric charges extracted from the electrochromic film; and stopping extracting the electric charges when the electric charges reaches a pre-set amount corresponding to the desired state.

Another aspect of the present disclosure is directed to another method of changing an optical state of an electrochromic film. The method may include setting a plurality of pre-determined optical states of the electrochromic film; determining an amount of electric charges corresponding to each of the plurality of pre-determined optical states; selecting a desired state of the plurality of pre-determined optical states; and adjusting an amount of electric charges within the electrochromic film to the determined amount of electric charges corresponding to the selected desired state.

Various embodiments of the present disclosure provide a method of changing an optical state of an electrochromic film in an electrochromic device, comprising determining a color of the electrochromic film; determining an amount of adjustment to be applied to the color; and controlling an amount of electric charges injected into and removed from the electrochromic film based on the determined amount of adjustment.

In some embodiments, the determining an amount of adjustment to be applied to the color further comprises determining a difference between the color and a target color of the electrochromic film. In some embodiments, the target color is a color of an electrochromic film in another electrochromic device in a same room, house, building, or dwelling. In some embodiments, the target color is preset to be a same color for all electrochromic films in other electrochromic devices in a same room, house, building, or dwelling. In some embodiments, the target color is a color of the electrochromic film when the electrochromic film is in a dark state and an undegraded state. In some embodiments, the target color is a color of the electrochromic film when the electrochromic film is in a light state and an undegraded state. In some embodiments, the determining an amount of adjustment to be applied to the color further comprises: determining whether the difference is greater than a threshold amount; and in response to determining that the difference is greater than the threshold amount, injecting or removing electric charges into the electrochromic film until the difference is less than the threshold amount. In some embodiments, the controlling an amount of electric charges injected into and removed from the electrochromic film comprises injecting or removing an amount of electric charges determined to obtain the target color of the electrochromic film. In some embodiments, the determining a color of the electrochromic film comprises: determining a transmittance state of the electrochromic film; and determining the color of the electrochromic film based on the determined transmittance state, and based on a relationship between the transmittance state and the color of the electrochromic film. In some embodiments, the determining an amount of adjustment to be applied to the color further comprises: determining the amount of adjustment to be applied to the color based on a rate of change of the color relative to a change in the transmittance state. In some embodiments, the controlling an amount of electric charges injected into and removed from the electrochromic film comprises applying an external DC voltage to the electrochromic film. In some embodiments, the controlling an amount of electric charges injected into and removed from the electrochromic film comprises applying an external DC current to the electrochromic film. In some embodiments, the controlling an amount of electric charges injected into and removed from the electrochromic film comprises applying an external pulsed voltage to the electrochromic film. In some embodiments, the controlling an amount of electric charges injected into and removed from the electrochromic film comprises applying an external pulsed current to the electrochromic film. In some embodiments, the controlling an amount of electric charges injected into and removed from the electrochromic film comprises applying a combination of an external voltage and an external current to the electrochromic film.

In some embodiments, the determining a color of the electrochromic film comprises determining a color reflected by the electrochromic film or determining a color transmitted by the electrochromic film. In some embodiments, the determining a color of the electrochromic film comprises determining one or more of a transmitted color and a reflected color. In some embodiments, the determining a color of the electrochromic film comprises determining a refracted color.

In some embodiments, the method further comprises directly preinstalling the electrochromic device into a window frame.

Various embodiments of the present disclosure provide a method of changing an optical state of an electrochromic film in an electrochromic device, comprising detecting a light intensity of external light; and adjusting a level of transmission of the electrochromic film based on the detected light intensity or a change in the detected light intensity.

In some embodiments, the method further comprises detecting the light intensity simultaneously with providing a power to the electrochromic device. In some embodiments, the detecting a light intensity comprises: determining an amount of current generated during a process of providing the power; and detecting the light intensity based on the determined amount of current generated. In some embodiments, the detecting the light intensity based on the determined amount of current generated comprises detecting the light intensity based on a linear relationship between the light intensity and the amount of current generated.

Other objects, features and advantages of the described embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which.

DETAILED DESCRIPTION OF THE PREFERRED EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of but a small number of embodiments within the scope of the present invention. Various changes and modifications obvious to one skilled in the art to which the present invention pertains are deemed to be within the spirit, scope and contemplation of the present invention as further defined in the appended claims.

Unless the context requires otherwise, throughout the present specification and claims, the word "comprise" and variations thereof, such as, "comprises" and "comprising" are to be construed in an open, inclusive sense, that is as "including, but not limited to". Numeric ranges are also inclusive of the numbers defining the range. Additionally, the singular forms "a", "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Figure 1:
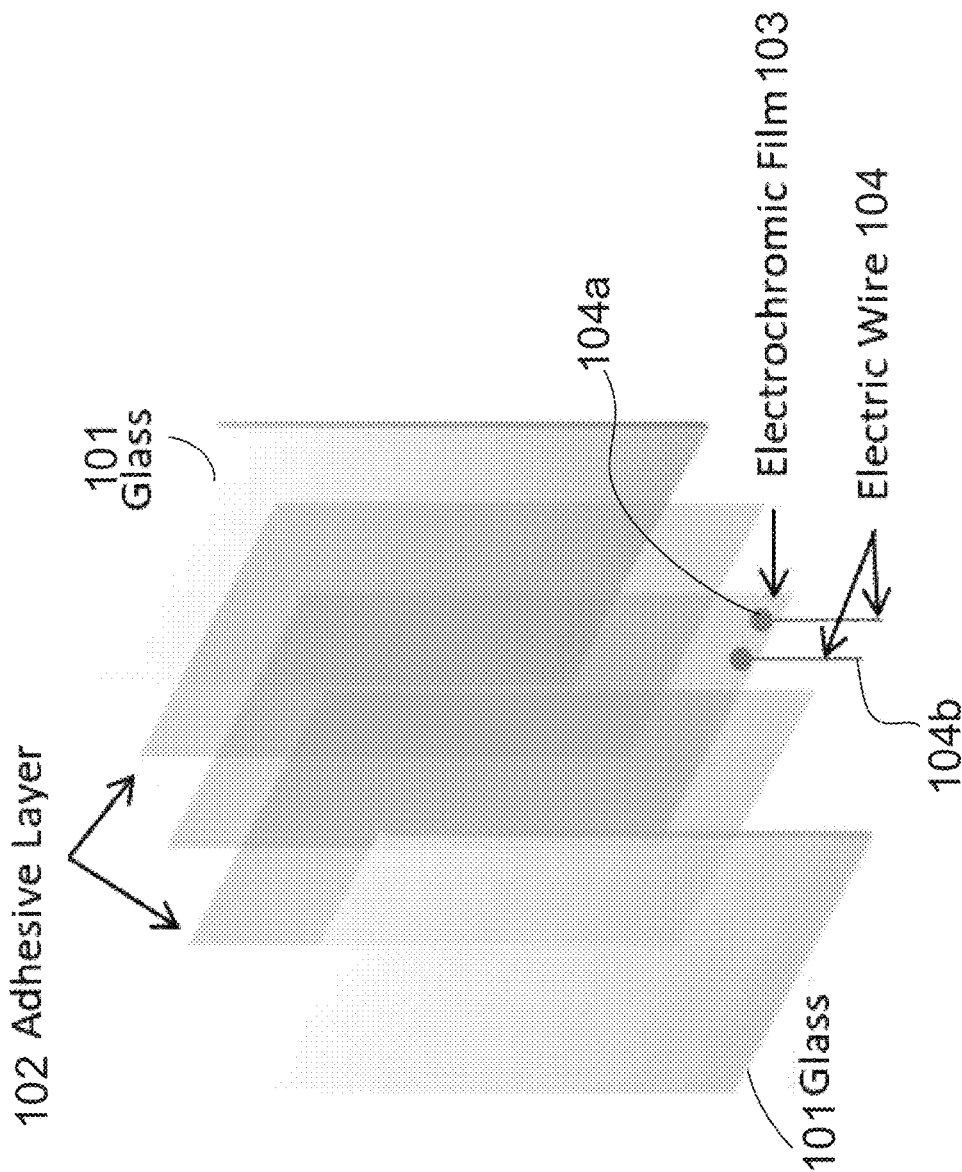
FIG. 1 is a graphical presentation illustrating a simplified schematic of an electrochromic device, consistent with exemplary embodiments of the present disclosure.
Figure 3:
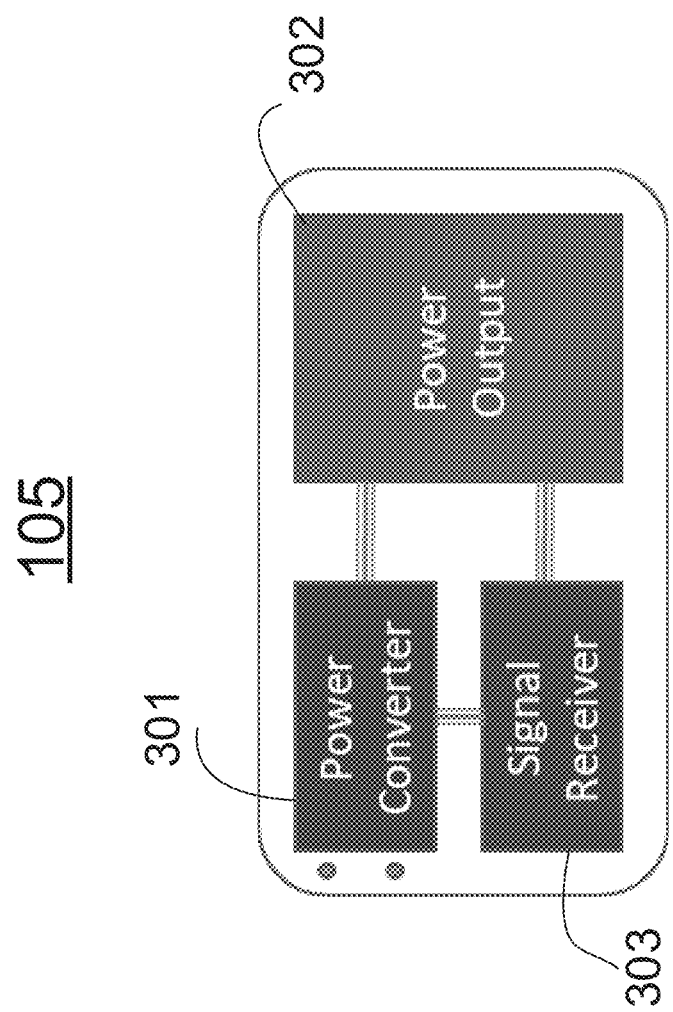
FIG. 3 is a graphical presentation illustrating a controller, consistent with exemplary embodiments of the present disclosure.

Electrochromic materials are commonly used in electrochromic devices. FIG. 1 is a graphical illustration showing a simplified schematic of an electrochromic device 100 (e.g., a smart window), consistent with exemplary embodiments of the present disclosure. The electrochromic device 100 may include two layers of glass 101, two adhesive layers 102, an electrochromic film 103, one or more electric wires 104, and a controller 105 (as shown in FIG. 3).

The electrochromic film 103 may be sandwiched between the two layers of glass 101. The adhesive layers 102 are configured to attached the electrochromic film 103 to the layers of glass 101. The integration of the electrochromic film 103 with the window (layers of glass 101) is described in details in patent application U.S. Ser. No. 15/399,852, which is incorporated herein by reference. In some examples, the electrochromic film 103 may be attached to an outer layer of the glass 101 and/or fastened to the glass 101, for example, via a frame. In some examples, the electrochromic device 100 may be directly preinstalled into a window frame.

One end 104a of the electric wires 104 is electrically connected to the electrochromic film 103. The other end 104b of the electric wires 104 is electrically connected to the controller 105. The controller 105 may be configured to control the state of the electrochromic device 100 by controlling the states of the electrochromic film 103. The controller 105 may be placed outside the glass 101, or laminated between the two layers of glass 101 similar to the electrochromic film 103.

In some embodiments, the adhesive layers 102 may include a polymeric material, particularly a thermosetting polymer material. Suitable thermoset polymer materials may include, but are not limited to, polyvinyl butyral (PVB), ethylene-vinyl acetate (EVA), polyurethanes, etc. In some embodiments, the two adhesive layers may comprise a material that not only is configured to bond the electrochromic film thereto, but is also transparent. The two adhesive layers may comprise the same materials or different materials.

The electrochromic film 103 comprises a solid electrolyte disposed therein, according to one embodiment. The detailed structure of the electrochromic film 103 is shown in FIG. 2 and described in detail below.

The exemplary electrochromic device 100 shown in FIG. 1 can be the electrochromic devices described in the specification and shown in the other figures.

Figure 2:
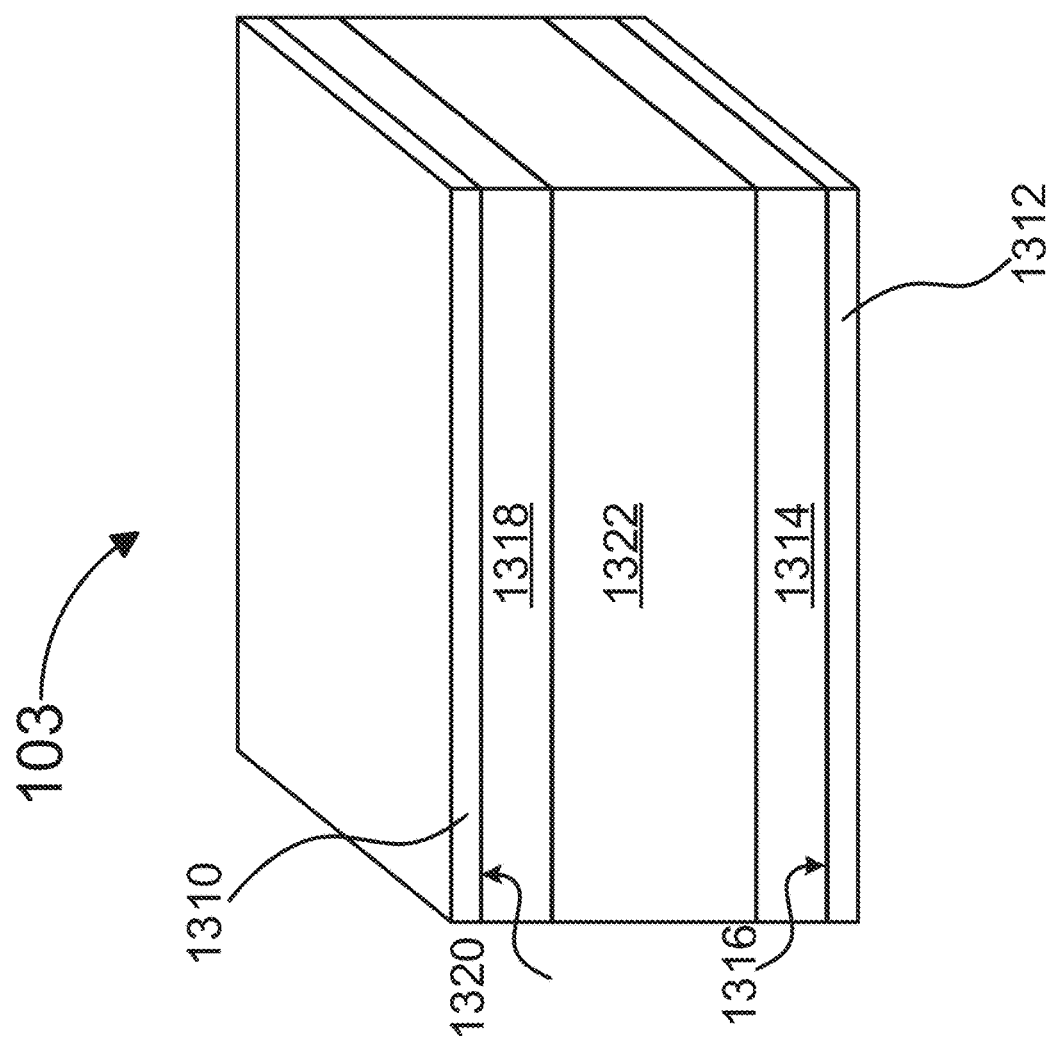
FIG. 2 is a sectional view of a simplified schematic of an electrochromic device comprising a solid polymer electrolyte therein, consistent with exemplary embodiments of the present disclosure.

As shown in FIG. 2, the electrochromic film 103 may include a first transparent electrically conductive film 1312 and a second transparent electrically conductive film 1310. The first and second electrically conductive films 1312, 1310 may have the same or different dimensions, comprise the same or different material, etc. In some embodiments, the first and second transparent electrically conductive films may be adhesive films as shown in FIG. 1. In some other embodiments, the first and second transparent electrically conductive films may be additional films. The first and second electrically conductive films 1312, 1310 may also each independently have a single layer or multilayer structure. Suitable material for the first and second electrically conductive films 1312, 1310 may include, but is not limited to, tin doped indium oxide (ITO), fluorine doped indium oxide, antimony doped indium oxide, zinc doped indium oxide, aluminum doped zinc oxide, silver nano wire, metal mesh, combinations thereof, and/or other such transparent material exhibiting sufficient electrical conductance. In preferred aspects, the first and second electrically conductive films 1312, 1310 may comprise ITO.

As further shown in FIG. 2, a layer 1314 of electrochromic material is deposited on an interior surface 1316 of the first electrically conductive film 1312. The layer 1314 of electrochromic material is configured to effect a reversible color change upon reduction (gain of electrons) or oxidation (loss of electron) caused by an electrical current. In some embodiments, the layer 1314 of electrochromic material may be configured to change from a transparent state to a colored state, or from a colored state to another colored state, upon oxidation or reduction. In some embodiments, the layer 1314 of electrochromic material may be a polyelectrochromic material in which more than two redox states are possible, and may thus exhibit several colors.

In some embodiments, the layer 1314 of electrochromic material may comprise an organic electrochromic material, an inorganic electrochromic material, a mixture of both, etc. The layer 1314 of electrochromic material may also be a reduction colored material (i.e., a material that becomes colored upon acquisition of electrons), or an oxidation colored material (i.e., a material that becomes colored upon the loss of electrons).

In some embodiments, the layer 1314 of electrochromic material may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the layer 1314 of electrochromic material may include a conductive polymer such as poly-3,4-ethylenedioxy thiophene (PEDOT), poly-2,2'-bithiophene, polypyrrole, polyaniline (PANI), polythiopene, polyisothianaphthene, poly(o-aminophenol), polypyridine, polyindole, polycarbazole, polyquinone, octacyanophthalocyanine, combinations thereof, etc. Moreover, in some embodiments, the layer 1314 of electrochromic material may include materials, such as viologen, anthraquinone, phenocyazine, combinations thereof, etc. Additional examples of electrochromic materials, particularly those including multicolored electrochromic polymers, may be found in U.S. Patent Application No. 62/331,760, filed May 4, 2016, titled Multicolored Electrochromic Polymer Compositions and Methods of Making and Using the Same, and U.S. patent application Ser. No. 15/399,839, filed on Jan. 6, 2017, titled Multicolored Electrochromic Polymer Compositions and Methods of Making and Using the Same. The entirety of the above-referenced two applications are herein incorporated by reference.

As additionally shown in FIG. 2, a charge storage layer 1318 is deposited on an interior surface 1320 of the second electrically conductive film 1310. Suitable materials for the charge storage layer 1318 may include, but are not limited to, vanadium oxide, binary oxides (e.g., CoO, $IrO_2$, MnO, NiO, and $PrO_x$), ternary oxides (e.g., $Ce_xV_yO_z$), etc.

In some embodiments, the charge storage layer 1318 may be replaced with an optional second layer of electrochromic material. This optional second layer of electrochromic material may have the same or different dimensions, comprise the same or different composition, etc., as the first layer 1314 of electrochromic material.

The electrochromic film 103 also includes an electrolyte layer 1322 positioned between the layer 1314 of electrochromic material and the charge storage layer 1318. In some embodiments, the electrolyte layer 1322 may include a liquid electrolyte as known in the art. In some embodiments, the electrolyte layer 1322 may include a solid state electrolyte, including but not limited to, $Ta_2O_5$, MgF, $Li_3N$, $LiPO_4$, $LiBO_2$—$Li_2SO_4$, etc. In some embodiments, the electrolyte layer 1322 may include a polymer based electrolyte comprising an electrolyte salt (e.g., LiTFSI, $LiPF_6$, $LiBF_4$, $LiClO_4$, $LiCF_3SO_3$, $LiN(CF_3SOd_2)_2$, LiSbFg, $LiAsF_6$, $LiN(CF_3CF_2SO_2)_2$, $(C_2H_5)_4NBF_4$, $(C_2H_5)_3CH_3NBF_4$, LiI, etc.), a polymer matrix (e.g., polyethylene oxide, poly(vinylidene fluoride(PVDF), poly(methyl methacrylate) (PMMA), polyethylene oxide (PEO), poly(acrylonitrile) (PAN), polyvinyl nitrile, etc.), and one or more optional plasticizers (e.g., glutaronitrile, succinonitrile, adiponitrile, fumaronitrile, etc.).

In some embodiments, the electrolyte layer 1322 comprises a solid polymer electrolyte. In one embodiment, the solid polymer electrolyte comprises a polymer framework, at least one solid plasticizer, and at least one electrolyte salt. In some embodiments, the polymer framework may include a polar polymer material having an average molecular weight of about 10,000 Daltons or greater. In particular embodiments, the polar polymer material may have an average molecular weight in a range from about 10,000 Daltons to about 800,000,000 Daltons. In some embodiments, the polar polymer material may be present in an amount ranging from about 15 wt. % to about 80 wt. % based on the total weight of the solid polymer electrolyte.

The aforementioned polar polymer material may include one or more polar polymers, each of which may include one or more of: C, N, F, O, H, P, F, etc. Suitable polar polymers may include, but are not limited to, polyethylene oxide, poly(vinylidene fluoride-hexafluoropropylene, poly(methyl methacrylate), polyvinyl nitrile, combinations thereof, etc. In embodiments where a plurality of polar polymers is present, the polymers may be crosslinked to form a network having enhanced mechanical properties.

The polar polymer material may have a sufficient amorphicity so as to achieve sufficient ion conductivity. Amorphous polymer materials typically exhibit high ion conductivities. Accordingly, in some embodiments, the polar material disclosed herein may have an amorphous, or a substantially amorphous, microstructure.

In some embodiments, the polar polymer material may have a semi-crystalline or crystalline microstructure. In such cases, various modifications may be implemented with respect to the polymer material to suppress the crystallinity thereof. For instance, one modification may involve use of branched polar polymers, linear random copolymers, block copolymers, comb polymers, and/or star-shaped polar polymers. Another modification may include incorporation of an effective amount of solid plasticizers in the polar polymer material, as discussed in greater detail below.

Various properties of the polar polymer material also may be selected and/or modified to maximize ion conductivity. These properties may include, but are not limited to, glass transition temperature, segmental mobility/flexibility of the polymer backbone and/or any side chains attached thereto, orientation of the polymers, etc.

As noted above, the presently disclosed solid electrolyte may include at least one solid plasticizer. The at least one solid plasticizer may be substantially miscible in the polymer framework of the solid plasticizer. The at least one solid plasticizer may include an organic material (e.g., small, solid organic molecules) and/or an oligomeric polymer material, in some embodiments. In various embodiments, the at least one solid plasticizer may be selected from the group including glutaronitrile, succinonitrile, adiponitrile, fumaronitrile, and combinations thereof.

In some embodiments, a plurality of solid plasticizers may be present in the polymer framework, where each plasticizer may independently include an organic material (e.g., small, solid organic molecules) and/or an oligomeric polymer material. Particularly, each plasticizer may independently be glutaronitrile, succinonitrile, adiponitrile, fumaronitrile, etc. Moreover, the dimensions of at least two, some, a majority, or all of the plasticizers may be the same or different as one another.

In some embodiments, the total amount of solid plasticizer may be in a range from about 20 wt. % to about 80 wt. % based on the total weight of the solid electrolyte.

As additionally noted above, the solid polymer electrolyte may include at least one electrolyte salt. In some embodiments, the at least one electrolyte salt may comprise an organic salt. In some embodiments, the at least one electrolyte salt may comprise an inorganic salt. Suitable electrolyte salts may include, but are not limited to, LiTFSI, $LiPF_6$, $LiBF_4$, $LiClO_4$, $LiCF_3SO_3$, $LiN(CF_3SO_2)_2$, LiSbFg, $LiAsF_6$, $LiN(CF_3CF_2SO_2)_2$, $(C_2H_5)_4NBF_4$, $(C_2H_5)_3CH_3NBF_4$, LiI, combinations thereof, etc. In some embodiments, the total amount of electrolyte salt may be in a range from about 10 wt. % to about 50 wt. % based on the total weight of the solid electrolyte.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. Additionally, the solid polymer electrolyte may have an ion conductivity in a range from about $10^{-7}$ S/cm to about $10^{-3}$ S/cm.

Methods of making the presently disclosed solid polymer electrolyte may include synthesis, polymerization, solvation, etc. processes as known in the art. In one particular, non-limiting embodiment, a method of making the presently disclosed polymer electrolyte may include: (a) combining the polymer framework, the at least one plasticizer, and the at least one electrolyte salt in an appropriate solvent; and (b) removing the solvent to obtain the solid polymer electrolyte. Exemplary solvents may include, but are not limited to, acetone, methanol, tetrahydrofuran, etc. In some embodiments, one or more experimental parameters may be optimized to facilitate the dissolving of the polymer framework, plasticizer, and electrolyte salt in the solvent. These experimental parameters may include the components remain in the solvent, agitation/stirring of the solvent, etc.

In some embodiments, the electrolyte layer 1322 of FIG. 2 comprises a solid polymer electrolyte, such as the solid polymer electrolytes described above, and does not include any liquid or gel electrolyte. Such a solid polymer electrolyte (i) has sufficient mechanical strength yet is versatile in shape so as to allow easy formation into thin films, and thin-film shaped products; (ii) avoids issues related to adhesion and print processing affecting conventional electrolytes; (iii) provides stable contact between the electrolyte/electrode interfaces (those with and without the electrochromic material coating thereon); (iv) avoids the problem of leakage commonly associated with liquid electrolytes; (v) has desirable non-toxic and non-flammable properties; (vi) avoids problems associated with evaporation due to its lack of vapor pressure; (vii) exhibits improved ion conductivities as compared to convention polymer electrolytes; etc.

Additional examples of electrolyte materials, particularly those including solid polymer electrolytes, may be found in U.S. Patent Application No. 62/323,407, filed Apr. 15, 2016, titled Solid Polymer Electrolyte for Electrochromic Devices, and U.S. patent application Ser. No. 15/487,325, filed on Apr. 13, 2017, titled Solid Polymer Electrolyte for Electrochromic Devices. The entirety of the above-referenced two applications are herein incorporated by reference.

The electrochromic film 103 may be used in various applications and/or in permutations, which may or may not be noted in the illustrative embodiments/aspects described herein. For instance, the electrochromic film 103 may include more or less features/components than those shown in FIG. 2, in some embodiments. Additionally, unless otherwise specified, one or more components of the electrochromic film 103 may be of conventional material, design, and/or fabricated using known techniques (e.g., sputtering, chemical vapor deposition (CVD), physical vapor deposition (PVD), plasma-enhanced chemical vapor deposition (PECVD), spray coating, slot-die coating, dip coating, spin coating, printing, etc.), as would be appreciated by skilled artisans upon reading the present disclosure.

FIG. 3 is a graphical presentation illustrating a controller 105, consistent with exemplary embodiments of the present disclosure. The controller 105 may include a power converter 301, a power output control 302, and a signal receiver 303. The power converter 301 may convert input power from a power source to the power required by the signal receiver 303 and the power output control 302. The power source could be either a power source integrated with the controller 105 as a self-contained, self-powered unit, or an external power source, provided by, for example, power of a building where the electrochromic device is installed. The power output control 302 may be configured to supply power to the electrochromic film 103. In particular, the power output 302 may be configured to supply voltage between the first and second electrically conductive films 1312, 1310. Since the state of the electrochromic film 103 is driven by electric charges, the power output control 302 can inject into or extract a certain amount of electric charges from the electrochromic film 103 based on the signals the signal receiver 303 receives, in order to change the state of the electrochromic film 103. The signal receiver 303 may be configured to receive signals sent to the controller 105, and transfer the signals to the power output control 302. In some embodiments, the signal receiver 303 may be connected to an external switch and a central switch to provide both local and global controls of the electrochromic device 100.

In the present application, we propose different methods for changing optical states of electrochromic materials. The optical states of electrochromic materials can be changed by or extracting electric charges into the electrochromic films. Both voltage driving and current driving can be employed to inject/extract electric charges. In addition, the combination of voltage driving and current driving can also be employed. Further, the voltage driving and the current driving can be operated at either direct current (DC) or alternating current (AC). As long as the required amount of electric charges are injected or extracted, the electrochromic film can be set at a certain optical state.

Changing Electrochromic Film's Optical State by Voltage Driving

In one embodiment, changing the optical state of an electrochromic film can be operated by a DC voltage. An external power supply outputs a constant voltage to the electrochromic film. The current through the film and the film's light transmission can be monitored over time. By applying the constant voltage, the charges are injected into the electrochromic film, inducing oxidation of the film, thereby changing its optical state.

Example 1

Figure 4:
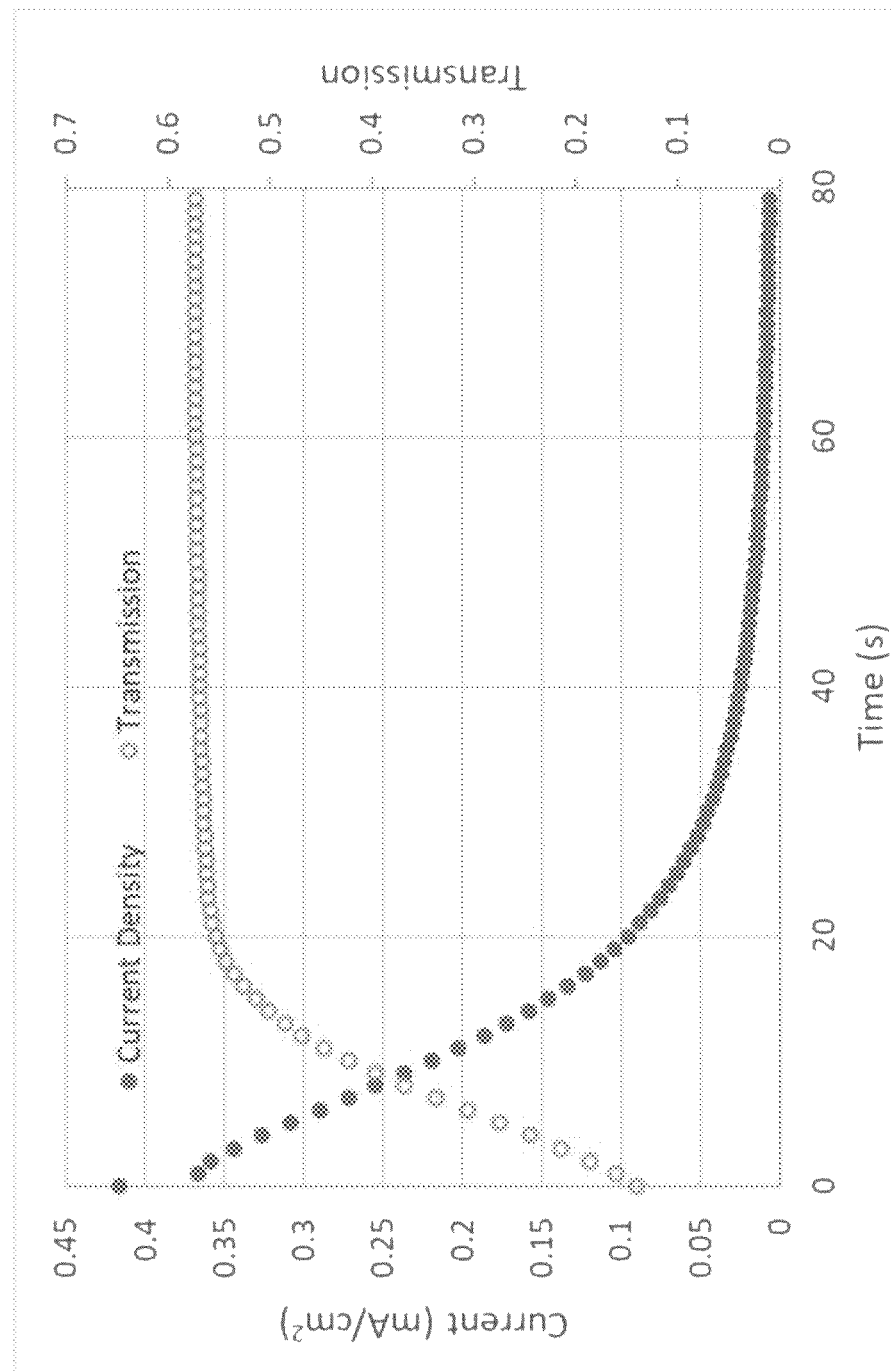
FIG. 4 is a graph illustrating a response of an exemplary electrochromic film changing from a dark state to a clear state under a constant voltage, consistent with exemplary embodiments of the present disclosure.

An exemplary electrochromic film is operated under a constant voltage of 1.5 V. FIG. 4 presents the response of the electrochromic film changing from a dark state (with minimum transmission) to a clear state (with maximum transmission) under a constant voltage. As shown in FIG. 4, the current density of electrochromic film continues decreasing over time, while the transmission of the electrochromic film increases as the voltage applied and becomes saturated after 20 s. This may indicate that the electrochromic film only requires certain amount of charges to change its state.

Figure 5:
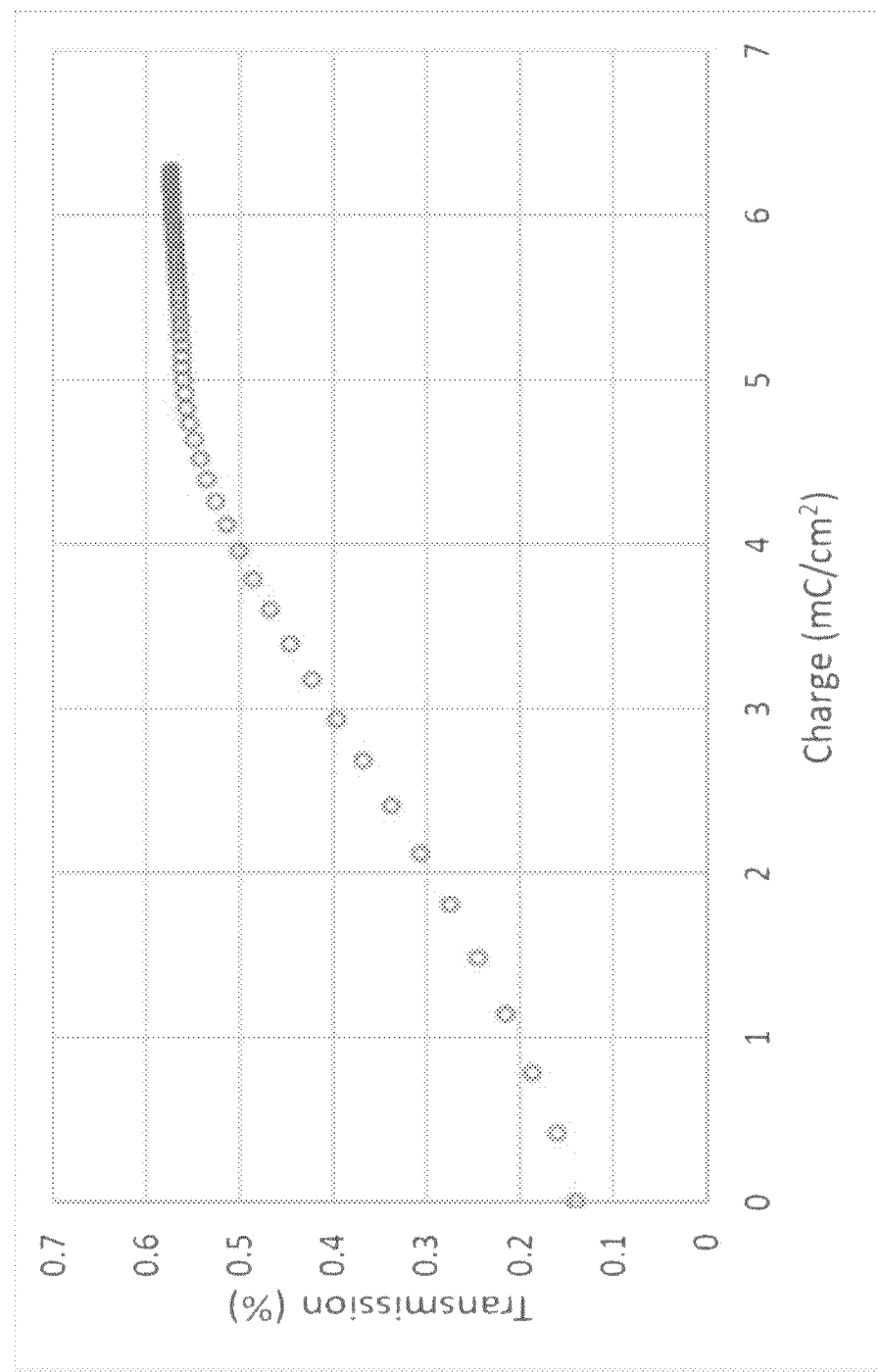
FIG. 5 is a graph illustrating dependence of transmission of an exemplary electrochromic film on the amount of injected charges under a constant voltage, consistent with exemplary embodiments of the present disclosure.

FIG. 5 shows dependence of the transmission of the electrochromic film on the amount of injected charges under a constant voltage of 1.5 V. The transmission of the electrochromic film increases as the amount of injected charges increases. By controlling the amount of the charges injected into the electrochromic film, the transmission of the electrochromic film can be adjusted accordingly. Thus, the transmission of the electrochromic film can be set at any state by injecting a certain amount of charges. For example, if the transmission of the electrochromic film is to be set at 40% from the dark state, a charge density of about 3 $mC/cm^2$ is needed to inject into the electrochromic film.

In another embodiment, to change the state of an electrochromic film from a clear state back to a dark state, the polarity of the external voltage can be switched. By switching the polarity of the external voltage, the charges can be extracted from the electrochromic film, inducing reduction of the electrochromic film, thereby changing its state.

Example 2

Figure 6:
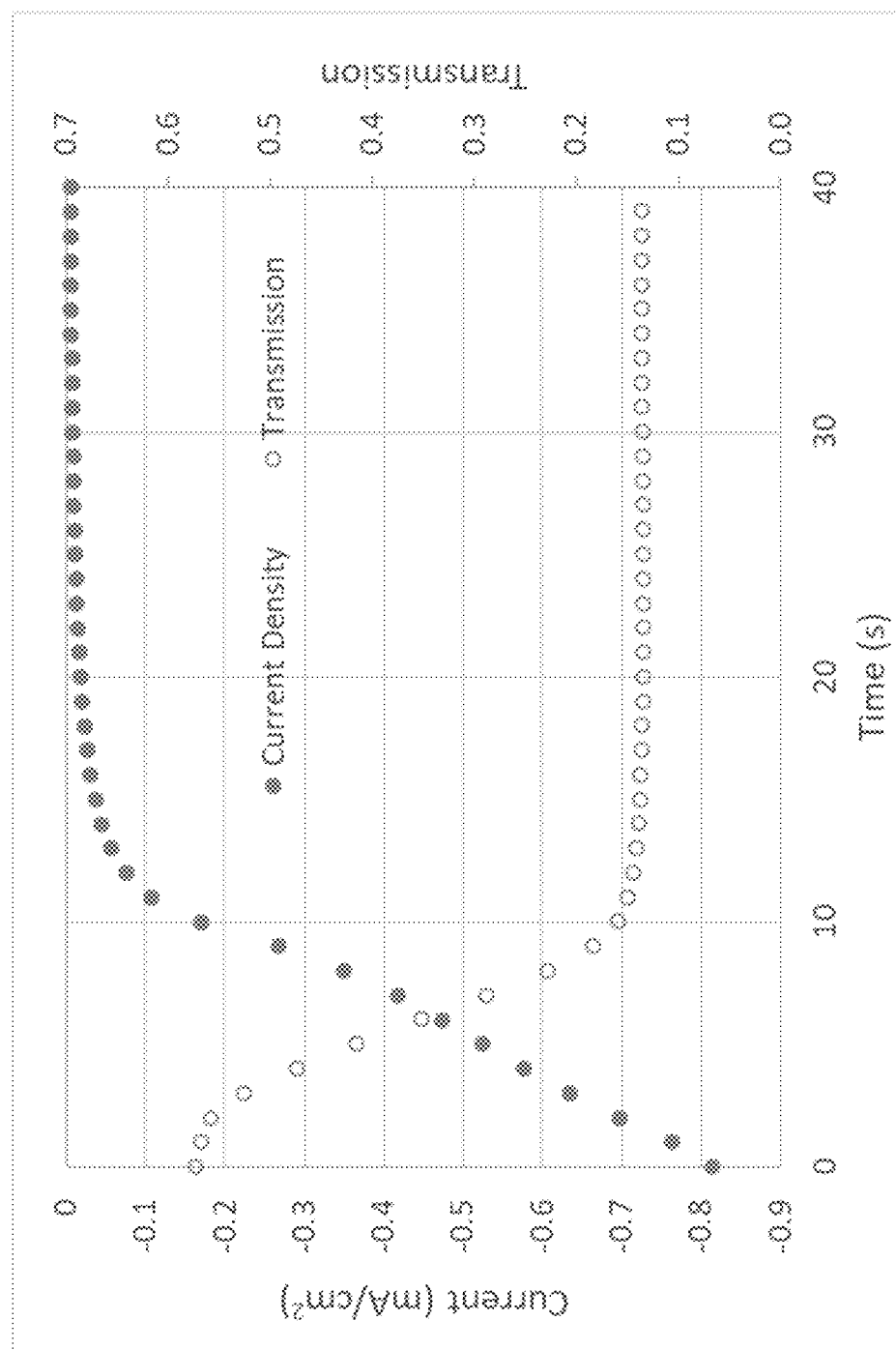
FIG. 6 is a graph illustrating a response of an exemplary electrochromic film changing from a clear state to a dark state under a constant voltage, consistent with exemplary embodiments of the present disclosure.
Figure 7:
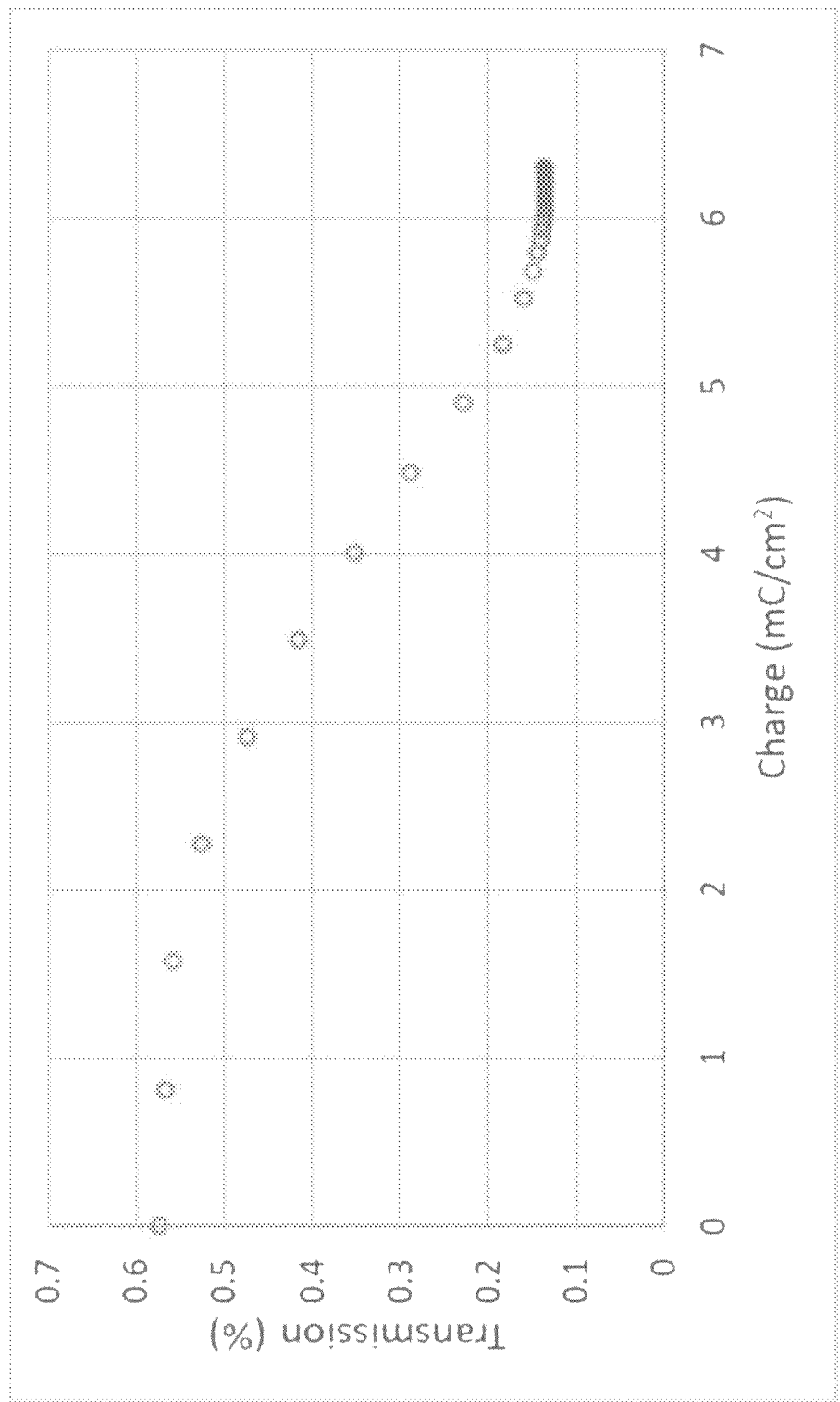
FIG. 7 is a graph illustrating dependence of transmission of an exemplary electrochromic film on the amount of extracted charges under a constant voltage, consistent with exemplary embodiments of the present disclosure.

Another exemplary electrochromic film is operated under a constant voltage of 1 V, as shown in FIGS. 6-7. FIG. 6 presents the response of the exemplary electrochromic film changing from a clear state (with maximum transmission) to a dark state (with minimum transmission) under a constant voltage. As shown in FIG. 6, negative current density indicates that the charge is extracted from the electrochromic film. As the current density drops to zero, the transmission of the electrochromic film decreases from the maximum to the minimum.

FIG. 7 shows dependence of the transmission of the electrochromic on the amount of extracted charges under a constant voltage. The transmission of the electrochromic film decreases as the amount of extracted charges increases. By controlling the amount of charges extracted from the electrochromic film, the transmission of the electrochromic film can be adjusted accordingly. The transmission of the electrochromic film can be set at any state by extracting a certain amount of charges. For example, if the transmission of the electrochromic film is to be set at 35% from the clear state, a charge density of about 4 $mC/cm^2$ should be set in the electrochromic film.

Changing Electrochromic Film's Optical State by Current Driving

In another embodiment, changing the optical state of an electrochromic film can be operated by constant DC current. An external power supply outputs a constant current to the electrochromic film. The current through the film and the film's transmission can be monitored over time. By applying the constant current, the charges are injected into the electrochromic film, inducing oxidation of the film, thereby changing its optical state.

Example 3

Figure 8:
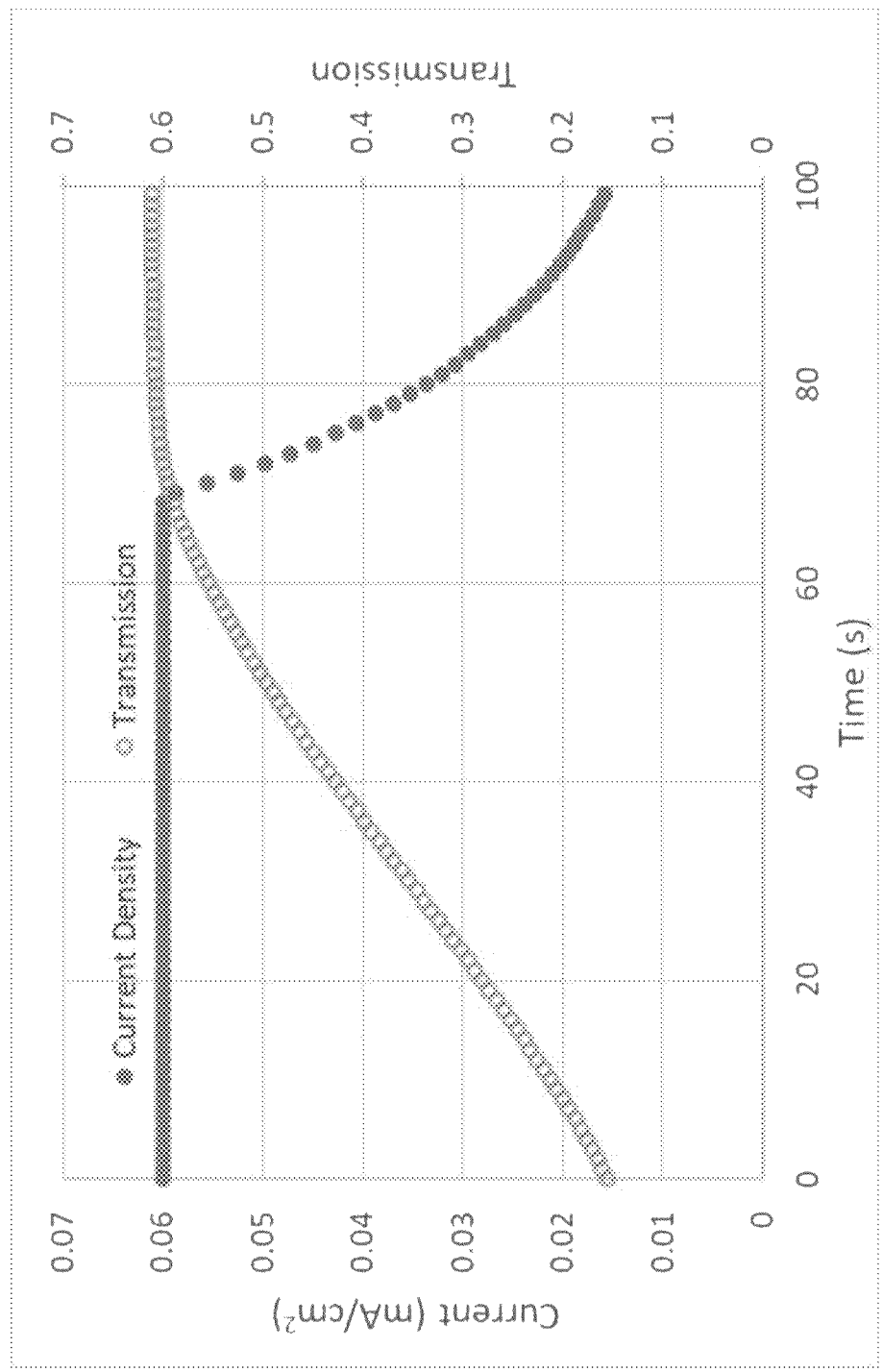
FIG. 8 is a graph illustrating a response of an exemplary electrochromic film changing from a dark state to a clear state under a constant current, consistent with exemplary embodiments of the present disclosure.
Figure 9:
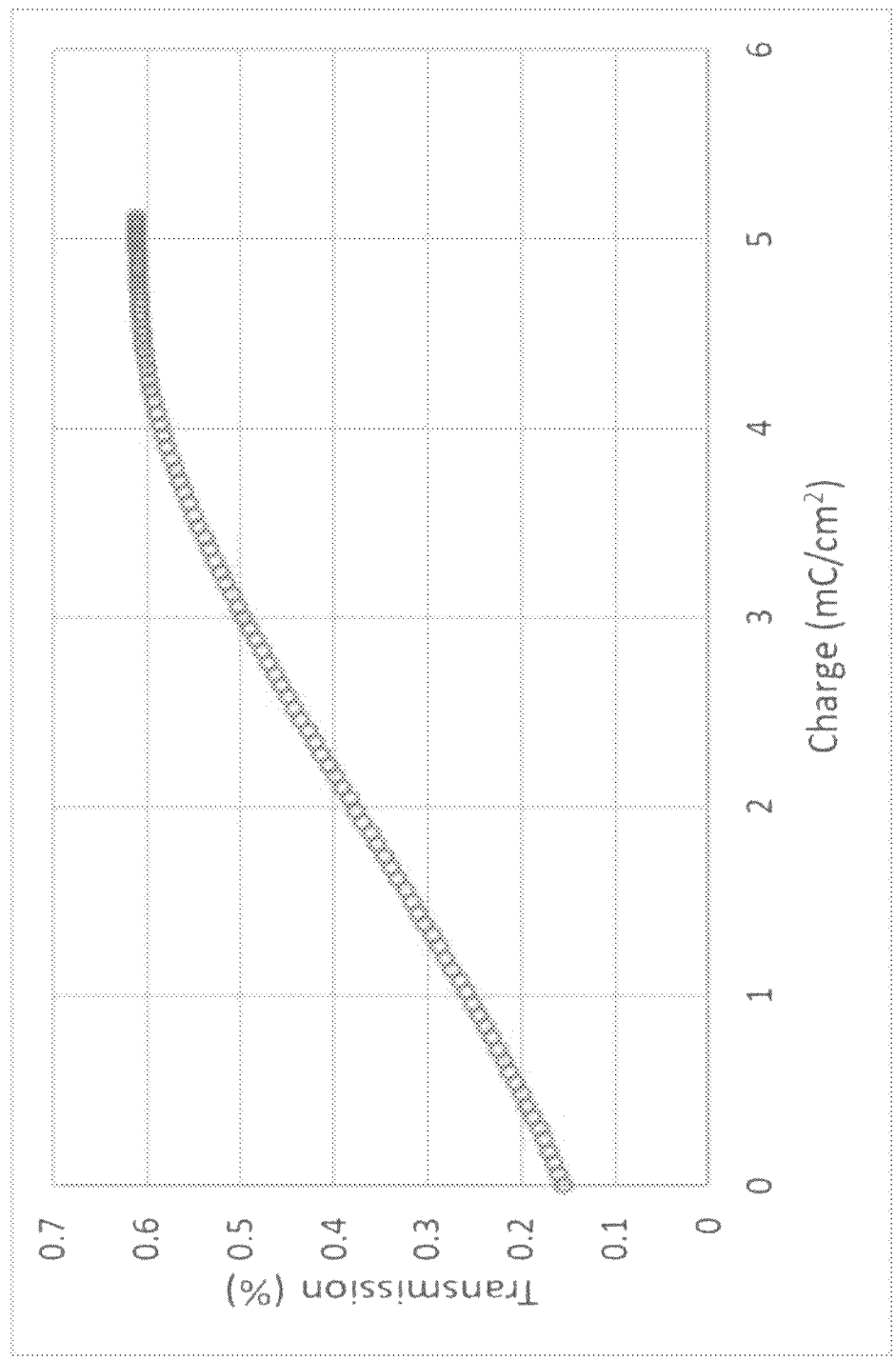
FIG. 9 is a graph illustrating dependence of transmission of an exemplary electrochromic film on the amount of injected charges under a constant current, consistent with exemplary embodiments of the present disclosure.

Another exemplary electrochromic film is operated under a constant current of 0.06 mA/cm$^2$, as shown in FIGS. 8-9. FIG. 8 presents the response of the exemplary electrochromic film changing from a dark state (with minimum transmission) to a clear state (with maximum transmission) under a constant current. As shown in FIG. 8, the transmission of the electrochromic film changes as the constant current supplied, and becomes saturated after around 70 s. The constant current sharply drops near when the film's transmission reaches the maximum. Since the amount of the charges injected equals the current times the time, this may indicate that after the state of the electrochromic film is totally switched from a clear state to a dark state, there's no need for any additional charge injection. Thus, by controlling the amount of the charges injected, the transmission of the electrochromic film can be adjusted.

FIG. 9 shows dependence of the transmission of the electrochromic film on the amount of the injected charges under a constant current. The transmission of the electrochromic film increases as the amount of the injected charges increases. By controlling the amount of charges injected into the electrochromic film, the transmission of electrochromic film can be adjusted accordingly. The transmission of the electrochromic film can be set at any state by injecting a certain amount of charges. For example, if the transmission of electrochromic film is to be set at 50% from the dark state, a charge density of about 3 mC/cm$^2$ is needed to inject into the electrochromic film.

In another embodiment, to change the state of an electrochromic film from a clear state back to a dark state, the polarity of the external current can be switched. By switching the polarity of the external current, the charges can be extracted from the electrochromic film, inducing reduction of the electrochromic film, thereby changing its state.

Example 4

Figure 10:
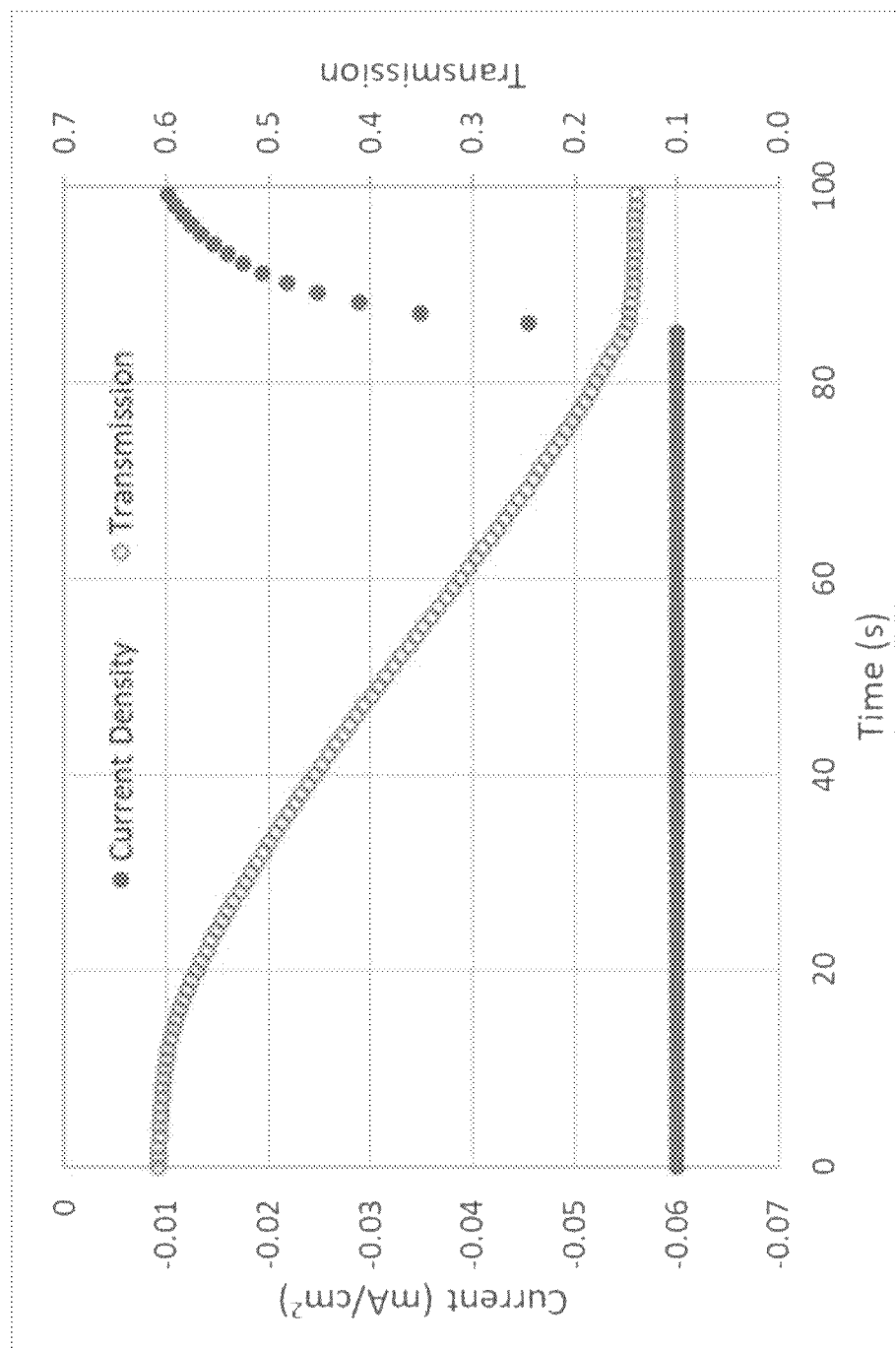
FIG. 10 is a graph illustrating a response of an exemplary electrochromic film changing from a clear state to a dark state under a constant current, consistent with exemplary embodiments of the present disclosure.
Figure 11:
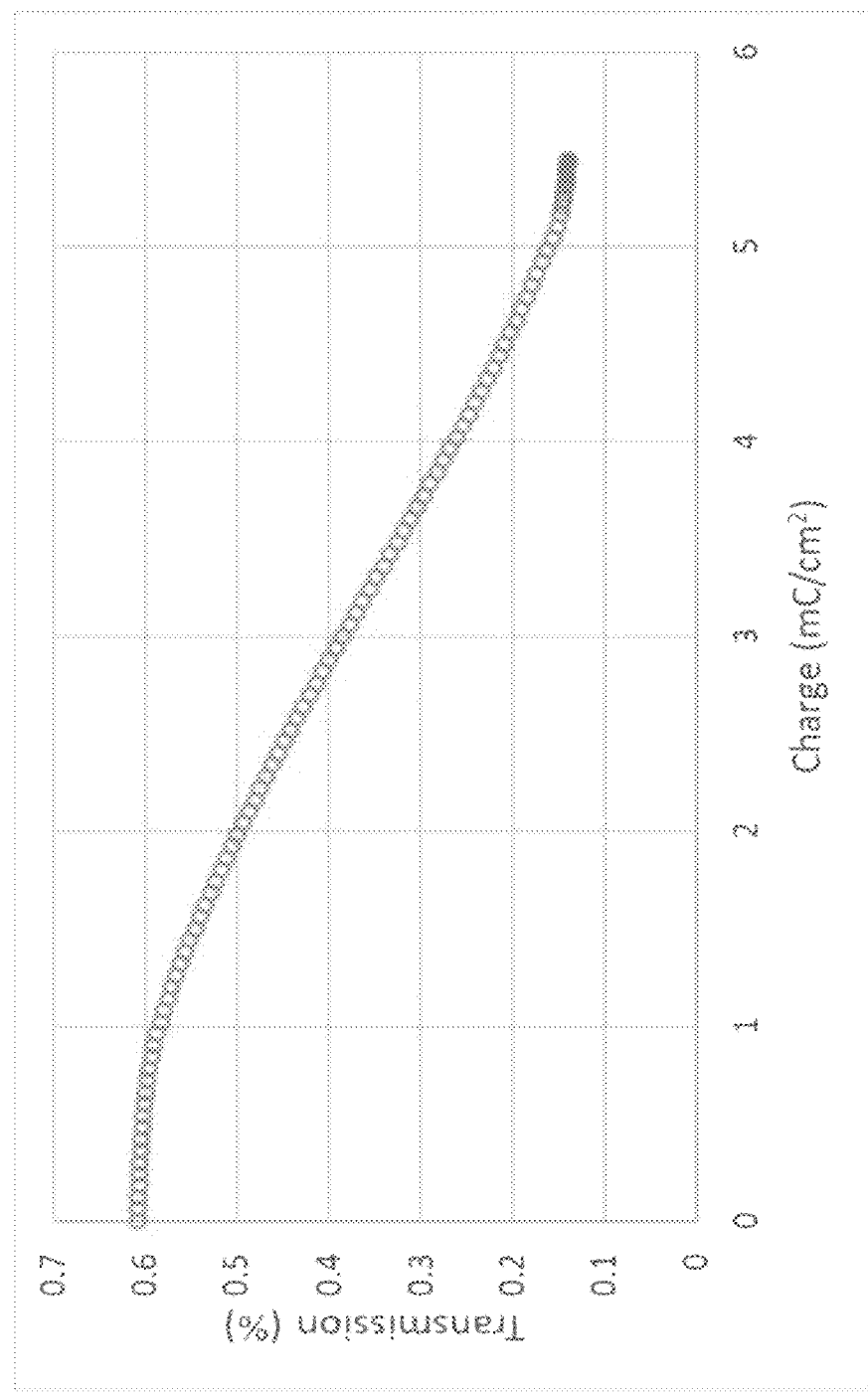
FIG. 11 is a graph illustrating dependence of transmission of an exemplary electrochromic film on the amount of extracted charges under a constant current, consistent with exemplary embodiments of the present disclosure.

Another exemplary electrochromic film is operated under a constant current of 0.06 mA/cm$^2$, as shown in FIGS. 10-11. FIG. 10 presents the response of the exemplary electrochromic film changing from a clear state (with maximum transmission) to a dark state (with minimum transmission) under a constant current. As shown in FIG. 10 negative current density indicates that the charge is extracted from the electrochromic film. The transmission of the electrochromic film changes as the constant current supplied. The constant current sharply drops near when the transmission of the electrochromic film reaches the minimum. Since the amount of charges extracted equals the current times the time, this may indicate that after the state of the electrochromic film is totally switched from the clear state to the dark state, there's no need for any additional charge extraction. Thus, by controlling the amount of the charges extracted, the transmission of the electrochromic film can be adjusted.

FIG. 11 shows dependence of the transmission of the electrochromic film on the extracted charges under a constant current. The transmission of the electrochromic film decreases as the amount of the extracted increases. By controlling the amount of charges extracted from the electrochromic film, the transmission of the electrochromic film can be adjusted accordingly. The transmission of the electrochromic film can be set at any state by extracting a certain amount of charges. For example, if the transmission of the electrochromic film is to be set at 40% from the clear state, a charge density of about 3 mC/cm$^2$ should be set in the electrochromic film.

FIGS. 12A, 12B, 13A, and 13B illustrate schematics of electrochromic devices 1200 and 1300 (e.g., a smart window), respectively, consistent with exemplary embodiments of the present disclosure. In FIGS. 12A, 12B, 13A, and 13B, a color of the electrochromic devices 1200 and 1300 may be monitored and/or changed. In some embodiments, a color of the electrochromic devices 1200 and 1300 may refer to a color of electrochromic films (e.g., 1203, 1303) in the electrochromic devices 1200 and 1300.

Figure 12A:
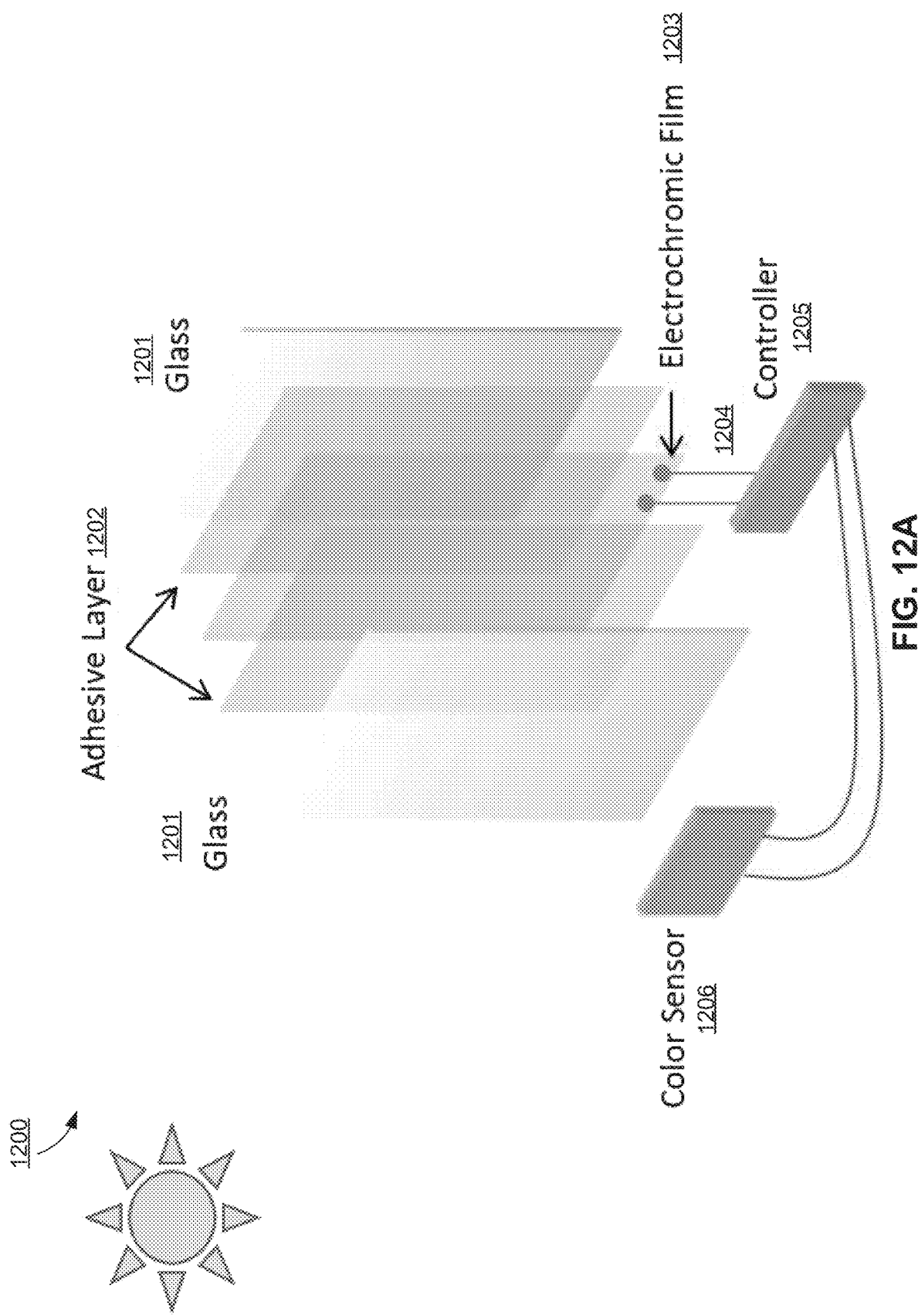
FIGS. 12A, 12B, 13A, and 13B are schematic illustrations of an electrochromic device (e.g., a smart window), consistent with exemplary embodiments of the present disclosure.

FIG. 12A is an illustration showing a schematic of an electrochromic device 1200 (e.g., a smart window), consistent with exemplary embodiments of the present disclosure. The electrochromic device 1200 may include two layers of glass 1201, two adhesive layers 1202, an electrochromic film 1203, one or more electric wires 1204, a controller 1205, and a color sensor 1206 integrated into the electrochromic device 1200. In some embodiments, the color sensor 1206 may be implemented as a spectrometer and/or a tristimulus colorimeter such as a tristimulus colorimeter described with respect to FIG. 15.

In some embodiments, the controller 1205 may comprise a signal receiver configured to receive a current color information of color coordinates or color dimensions of the electrochromic device 1200 from the color sensor 1206, and compare the received color information to a target color. The controller 1205 may adjust a current color of the electrochromic device 1200 to the target color based on a difference between current color information and the target color. In some examples, the controller 1205 may adjust a current color of the electrochromic device 1200 to be closer to the target color. For example, the controller 1205 may adjust a current color of the electrochromic device 1200 to be within a predetermined threshold from the target color. In some examples, controller 1205 may adjust a current color of the electrochromic device 1200 if the current color differs from the target color by more than a predetermined threshold, and may not adjust a current color of the electrochromic device 1200 if the current color differs from the target color by less than or equal to a predetermined threshold. In some examples, the controller 1205 may receive information of the target color by a global control. In some examples, the target color may be a baseline color of the electrochromic device 1200 at a dark state, at a clear state, or any transmittance state. Additionally or alternatively, in some examples, the target color may be a color of the electrochromic device 1200 that has not undergone electrochromic degradation or cycling (e.g., in an undegraded state). In some examples, the target color may be predetermined based on a color of one or more other windows in a same room, house, building, or dwelling. For example, the target color may be a same color as that of one or more other windows in a same room, house, building, or dwelling. In some examples, the target color may be preset to be a same color for all windows in a same room, house, building, or dwelling.

Figure 14:
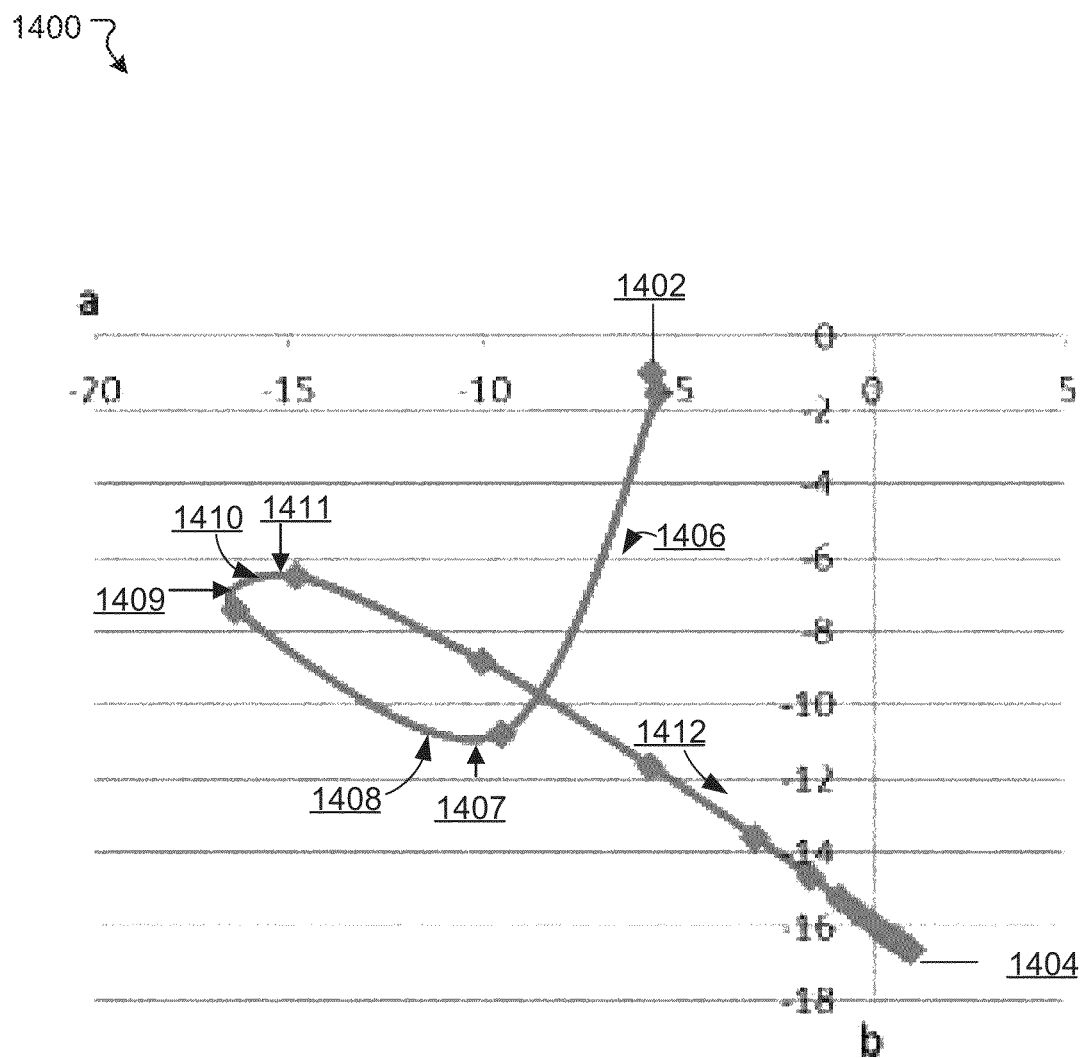
FIG. 14 is a graph showing an exemplary relationship between changes in color of an exemplary electrochromic device and changes in transmittance from a clear state to a dark state under a constant current.

In some examples, the controller 1205 may determine the color information based on a transmittance state of the electrochromic device 1200. For example, the controller 1205 may determine information of an optical state, for example, a transmittance state, of the electrochromic device 1200, such as whether the electrochromic device 1200 is in a clear state, a dark state, or somewhere in between a clear state and dark state, using a spectrometer and/or a tristimulus colorimeter. The controller 1205 may determine color coordinates of the electrochromic device 1200 based on a transmittance state and a predetermined relationship between color coordinates and a transmittance state of the electrochromic device 1200, such as a relationship 1400 as shown in FIG. 14. In some examples, the controller 1205 may further determine a rate of change of the color coordinates relative to a change in transmittance state and/or a stage of transmission of the electrochromic device 1200. The controller 1205 may determine an amount of adjustment needed based on the determined rate of change, and an amount of charges to be injected or withdrawn. For example, the controller 1205 may determine that the electrochromic device 1200 may be in a first stage (e.g., 1406 in FIG. 14), a second stage (e.g., 1408 in FIG. 14), a third stage 1410 in FIG. 14), or a fourth stage (e.g., 1412 in FIG. 14), as described with reference to FIG. 14. In some examples, the controller 1205 may determine that the electrochromic device is in the first stage 1406, and determine that in order to obtain the target color, the controller 1205 needs to add more red and yellow. From the determined color coordinates, the controller 1205 may determine a difference between the determined color coordinates and target color coordinates, and adjust a color of the electrochromic device 1200 to compensate for the difference between the determined color coordinates and the target color coordinates.

In some embodiments, the controller 1205 may be configured to adjust the color of the electrochromic device 1200 by injecting or withdrawing a certain amount of charges into the electrochromic device 1200. The controller 1205 may continuously monitor a current color of the electrochromic device 1200, continuously gather information of the difference between the current color and the target color, and continuously adjust the current color until the current color matches the target color or differs from the target color by less than a threshold. The controller 1205 may be configured to adjust the color of the electrochromic device 1200 to compensate or account for changes in transmittance state and/or electrochromic degradation of the electrochromic device 1200.

The electrochromic film 1203 may be sandwiched between the two layers of glass 1201. The adhesive layers 1202 are configured to attach the electrochromic film 1203 to the layers of glass 1201. The integration of the electrochromic film 1203 with the window (layers of glass 1201) is described in details in patent application U.S. Ser. No. 15/399,852, which is incorporated herein by reference.

One end of the electric wires 1204 may electrically connected to the electrochromic film 1203. An other end of the electric wires 1204 may be electrically connected to the controller 1205. The controller 1205 may be configured to control the optical state of the electrochromic device 1200 by controlling the optical states of the electrochromic film 1203. The controller 1205 may be placed outside the glass 1201, or laminated between the two layers of glass 1201 similar to the electrochromic film 1203.

In some embodiments, the adhesive layers 1202 may include a polymeric material, particularly a thermosetting polymer material. Suitable thermoset polymer materials may include, but are not limited to, polyvinyl butyral (PVB), ethylene-vinyl acetate (EVA), polyurethanes, etc. In some embodiments, the two adhesive layers may comprise a material that not only is configured to bond the electrochromic film thereto, but is also transparent. The two adhesive layers may comprise the same materials or different materials.

The electrochromic film 1203 may comprise a solid electrolyte disposed therein, according to one embodiment. The electrochromic film 1203 may be implemented as the electrochromic film 103 as shown in FIGS. 1 and 2.

Figure 12B:
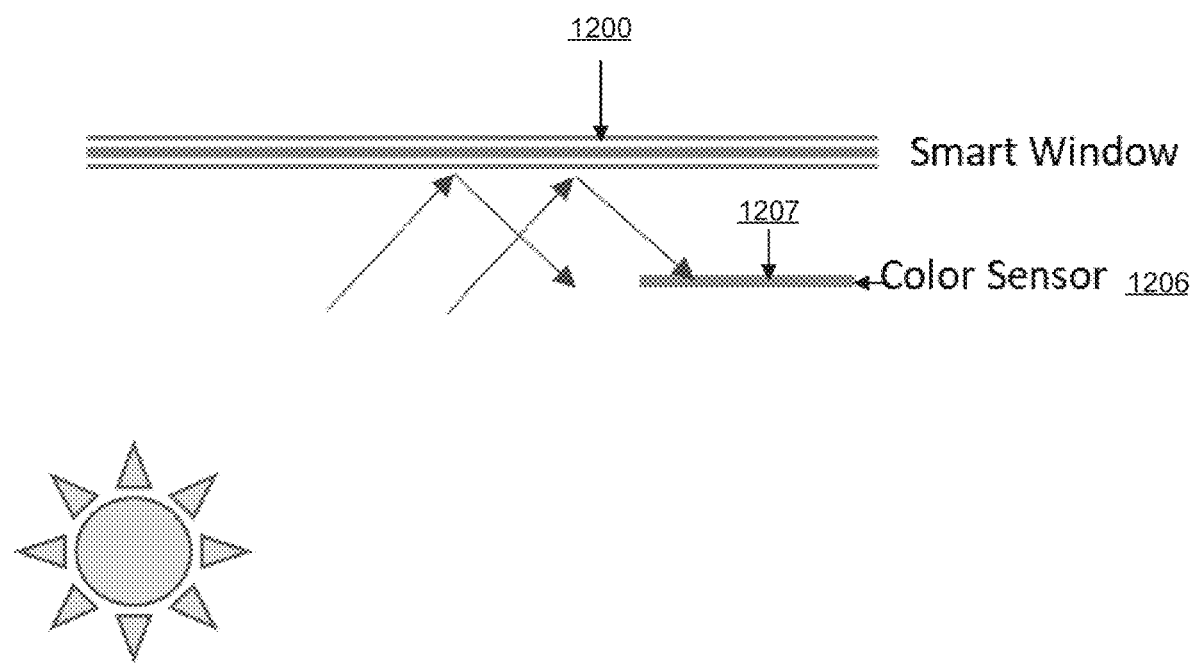

In some embodiments, as illustrated in diagram FIG. 12B, the color sensor 1206 may be disposed on an exterior surface of the electrochromic device 1200. The color sensor may comprise an active sensing portion 1207. The active sensing portion 1207 may face the electrochromic device 1200 rather than facing a sun in order to determine color information (e.g., color coordinates) of the electrochromic device 1200. Sun light may be reflected from the electrochromic device 1200, and received by the color sensor 1206. The active sensing portion 1207 may determine a reflected color from the electrochromic device 1200. The color of the electrochromic film 1203 may include the reflected color.

Figure 13A:
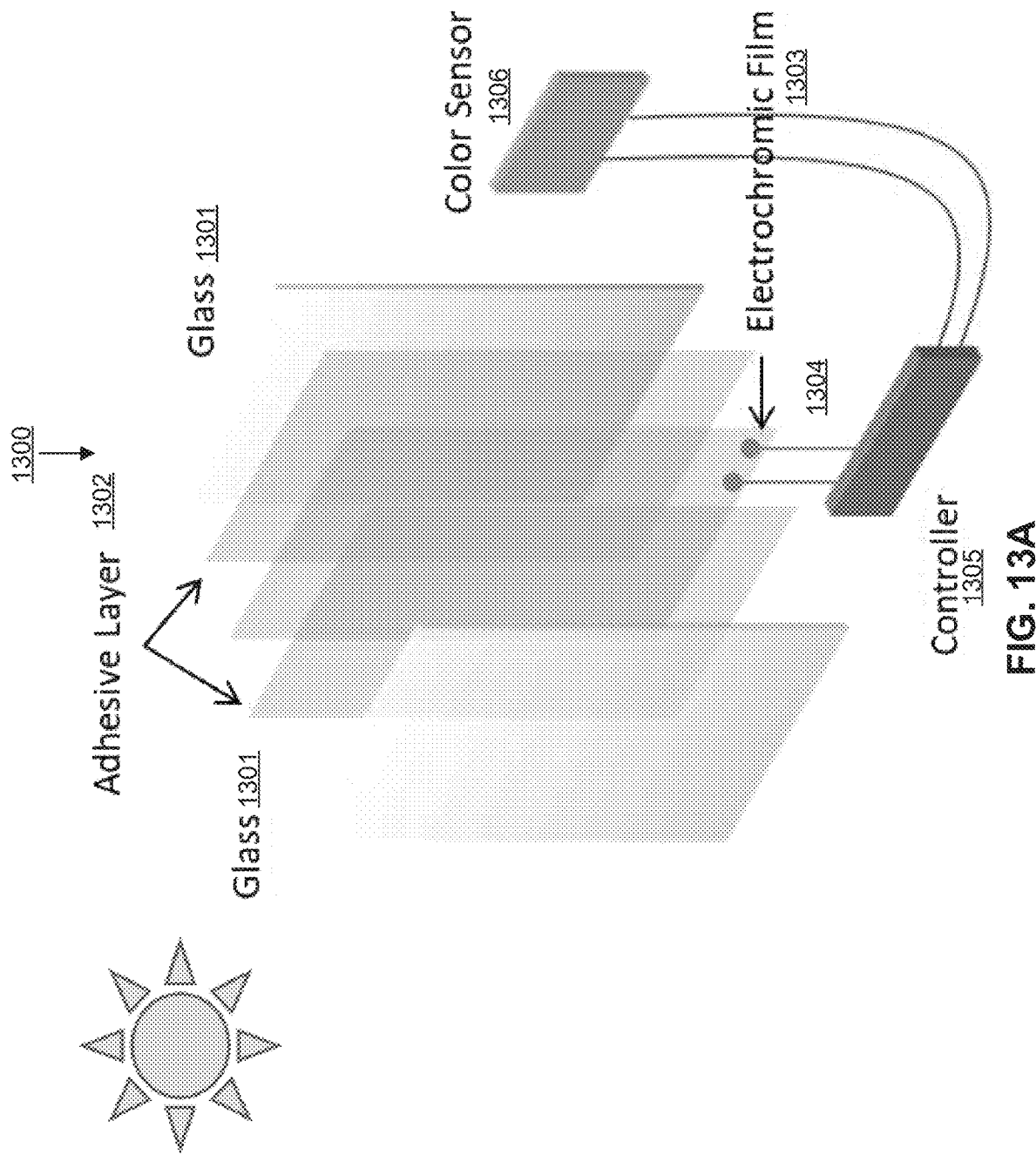
Figure 13B:
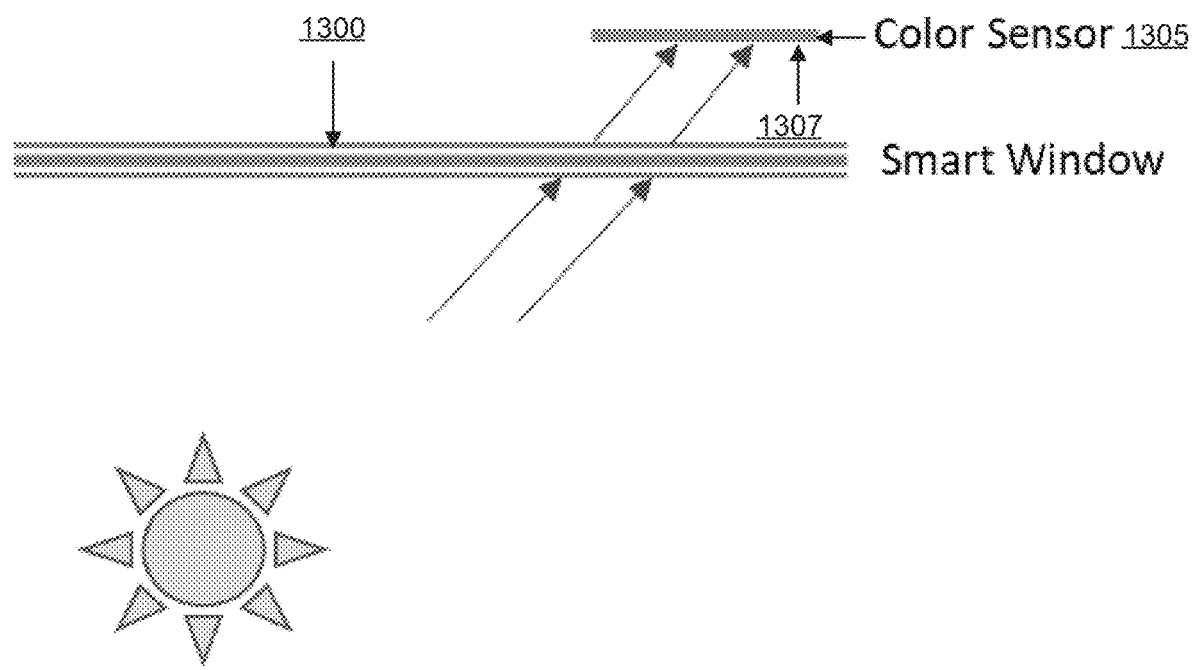

FIG. 13A is an illustration showing a schematic of an electrochromic device 1300 (e.g., a smart window), consistent with exemplary embodiments of the present disclosure. The electrochromic device 1300 may include two layers of glass 1301, two adhesive layers 1302, an electrochromic film 1303, one or more electric wires 1304, a controller 1305, and a color sensor 1306 integrated into the electrochromic device 1300. In some embodiments, the color sensor 1306 may be implemented as a spectrometer and/or a tristimulus colorimeter such as the tristimulus colorimeter 1300, as described above. The controller 1305 may be implemented as the controller 1205 of FIG. 12A. The two layers of glass 1301 may be implemented as the two layers of glass 1201 of FIG. 12A. The two adhesive layers 1302 may be implemented as the two adhesive layers 1202 of FIG. 12A. The electrochromic film 1303 may be implemented as the electrochromic film 1203 of FIG. 12A. The one or more electric wires 1304 may be implemented as the one or more electric wires 1204 of FIG. 12A.

In some embodiments, as illustrated in diagram FIG. 139, the color sensor 1306 may be disposed on an interior surface of the electrochromic device 1300. The color sensor 1306 may comprise an active sensing portion 1307. The active sensing portion 1307 may face the electrochromic device 1300 in order to determine color information (e.g., color coordinates) of the electrochromic device 1300. The sun light may be transmitted through the electrochromic device 1300, or refracted through the electrochromic device 1300, and received by the color sensor 1305. The active sensing portion 1307 may determine a transmitted color or a refracted color from the electrochromic device 1300. The color of the electrochromic film may include the transmitted color.

FIG. 14 shows an exemplary relationship between changes in color of an exemplary electrochromic device and changes in transmittance from a clear state to a dark state under a constant current. FIG. 14 depicts a relationship between color coordinates or color dimensions in a Lab color space, as denoted by (a,b), and states of transmittance. For example, a start point 1402 represents a color coordinate or color dimension of the electrochromic device when the electrochromic device is in a clear state, or a state with full or nearly full transmittance. The start point 1402 indicates that a color of the electrochromic device in a clear state has a mixture of green, red, yellow, and blue, with more green than red and more blue than yellow. As the electrochromic device transforms from a clear state to a dark state, amounts of green and blue increase while amounts of red and yellow decrease at a first stage 1406, until a second point 1407. In some embodiments, the first stage 1406 extends between the start point 1402 and the second point 1407. In some embodiments, a second stage 1408 extends between the second point 1407 and a third point 1409. During the second stage 1408, amounts of green and yellow increase while amounts of blue and red decrease. In some embodiments, a third stage 1410 extends between the third point 1409 and a fourth point 1411. During the third stage 1410, amounts of red and yellow increase while amounts of green and blue decrease. In some embodiments, a fourth stage 1412 extends between the fourth point 1411 and an end point 1404. During the fourth stage 1412, amounts of blue and red increase while amounts of green and yellow decrease. The end point 1404 represents a color coordinate or color dimension of the electrochromic device when the electrochromic device is in a dark state, or a state with little to no transmittance. In some embodiments, a relationship between color coordinates or color dimensions in a Lab color space and states of transmittance may be based on a level of electrochromic cycling, or a level or electrochromic degradation due to the electrochromic cycling. For example, a color coordinate at a clear state, or a color coordinate at a dark state, may change based on a level of electrochromic cycling.

If an electrochromic device is transitioning between a dark state to a light state, for example, from the end point 1404 to the start point 1402, a relationship between a color coordinate or color dimension and states of transmittance may be reversed, as the electrochromic device may sequentially pass through the fourth stage 1412, the third stage 1410, the second stage 1408, and the first stage 1406. In some examples, a color coordinate change of the electrochromic device may exhibit a hysteresis effect when transitioning between a dark state and a light state, compared to a color coordinate change of an electrochromic device transitioning between a light state and a dark state.

In some embodiments, a controller, such as the controller 1205 or the controller 1305, may determine a current color coordinate of the electrochromic device (e.g., 1200 or 1300), using information of a state of transmittance of the electrochromic device. For example, the controller may determine a location on a graph (e.g., graph depicting the relationship 1400 of FIG. 14) corresponding to the state of transmittance, and determine the current color coordinate from the state of transmittance, in lab coordinates. For instance, the controller may determine that the state of transmittance corresponds to the first stage 1406, or a point within the first stage 1406, and determine a corresponding color coordinate from the state of transmittance.

In some embodiments, a spectrometer and/or a tristimulus colorimeter may individually determine colors and levels of transmittance or transmittance states of the electrochromic device simultaneously. The spectrometer may determine a spectral power distribution of a light intensity over a range of wavelengths. The spectrometer or the tristimulus colorimeter may determine color information by integrating the spectral power distribution with CIE color-matching functions. The spectrometer or the tristimulus colorimeter may transform obtained color coordinates (x,y) into (u,v) or lab color spaces.

Figure 15:
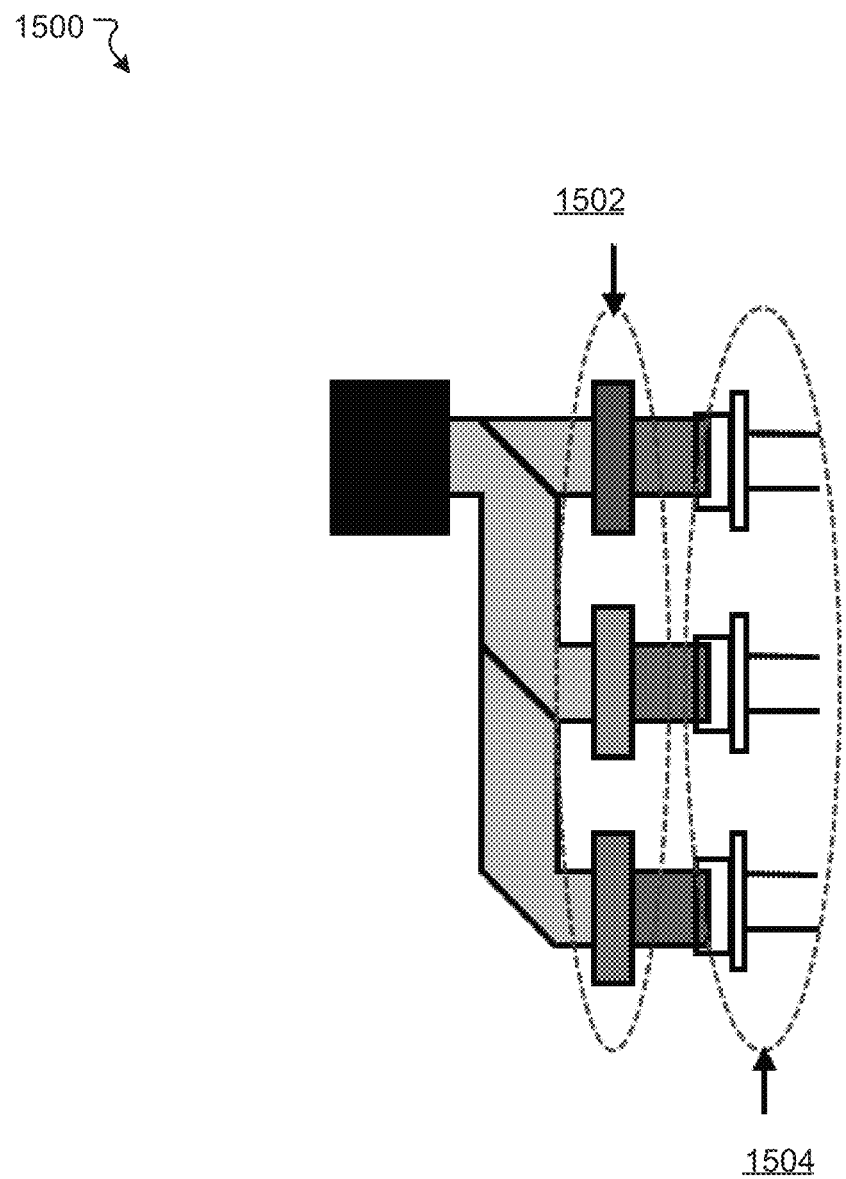
FIG. 15 is a schematic illustration of an exemplary tristimulus colorimeter.

FIG. 15 shows an exemplary tristimulus colorimeter 1500. The tristimulus colorimeter 1500 may comprise color filters 1502 and photodetectors 1504 respectively coupled with the color filters. The color filters 1502 may comprise a blue color filter, a green color filter, and a red color filter. The photodetectors 1504 may determine a light intensity of each of the respective color filters 1502. The photodetectors 1504 may comprise silicon diodes.

Figure 16:
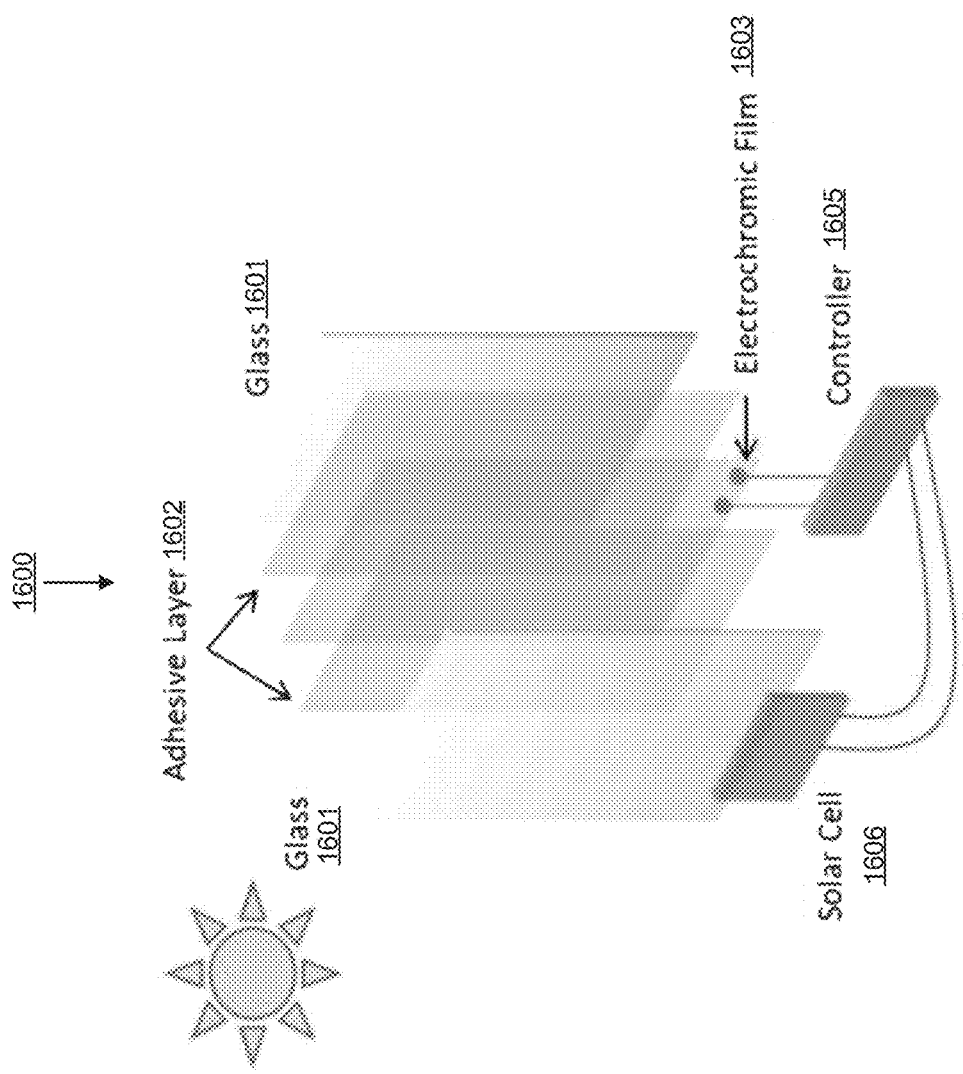
FIG. 16 is a schematic illustration of an electrochromic device (e.g., a smart window), consistent with exemplary embodiments of the present disclosure.

FIG. 16 is an illustration showing a schematic of an electrochromic device 1600 (e.g., a smart window), consistent with exemplary embodiments of the present disclosure. The electrochromic device 1600 may include two layers of glass 1601, two adhesive layers 1602, an electrochromic film 1603, one or more electric wires 1604, a controller 1605, and a solar cell 1606 integrated into the electrochromic device 1600. In some embodiments, the solar cell 1606 may be configured to supply energy to the controller 1605 by converting acquired solar energy into electric energy. In some examples, the converted electric energy may be stored in a power storage unit such as a battery or a capacitor. The solar cell 1606, in addition to generating energy, may simultaneously detect a light intensity. In some embodiments, the solar cell 1606 may detect the light intensity based on an amount of current generated by the solar cell 1606. In some examples, the solar cell 1606 may detect the light intensity based on a relationship between the current generated and the light intensity, and/or based on a predetermined relationship between the current generated and the light intensity. In some embodiments, the current generated by the solar cell linearly depends on the light intensity. In some examples, the solar cell 1606 may transmit information of or a signal indicating the light intensity to the controller 1605.

The controller 1605 may consume the stored electric energy in the power storage unit, for example, when an amount of converted electric energy generated by the solar cell 1606 is inadequate to operate the controller 1605. In response to receiving the information of or a signal indicating the light intensity, the controller 1605 may adjust a transmission state and/or a color of the electrochromic device 1600 by injecting or withdrawing a certain amount of power to the electrochromic device 1600. In some examples, the controller 1605 may adjust a level of transmission to be inversely related to the detected light intensity by the solar cell 1606. If the detected light intensity increases, the controller 1605 may reduce a level of transmission through the electrochromic device 1600. If the detected light intensity decreases, the controller 1605 may increase a level of transmission through the electrochromic device 1600.

The controller 1605 may further be configured to monitor and adjust a color of the electrochromic device 1600, similar to the implementation of the controller 1205 as described with respect to FIG. 12A. In some embodiments, the controller 1605 may be laminated between the two layers of glass 1601.

The two layers of glass 1601 may be implemented as the two layers of glass 1201 of FIG. 12A. The two adhesive layers 1602 may be implemented as the two adhesive layers 1202 of FIG. 12A. The electrochromic film 1603 may be implemented as the electrochromic film 1603 of FIG. 12A. The one or more electric wires 1604 may be implemented as the one or more electric wires 1204 of FIG. 12A.

Figure 17:
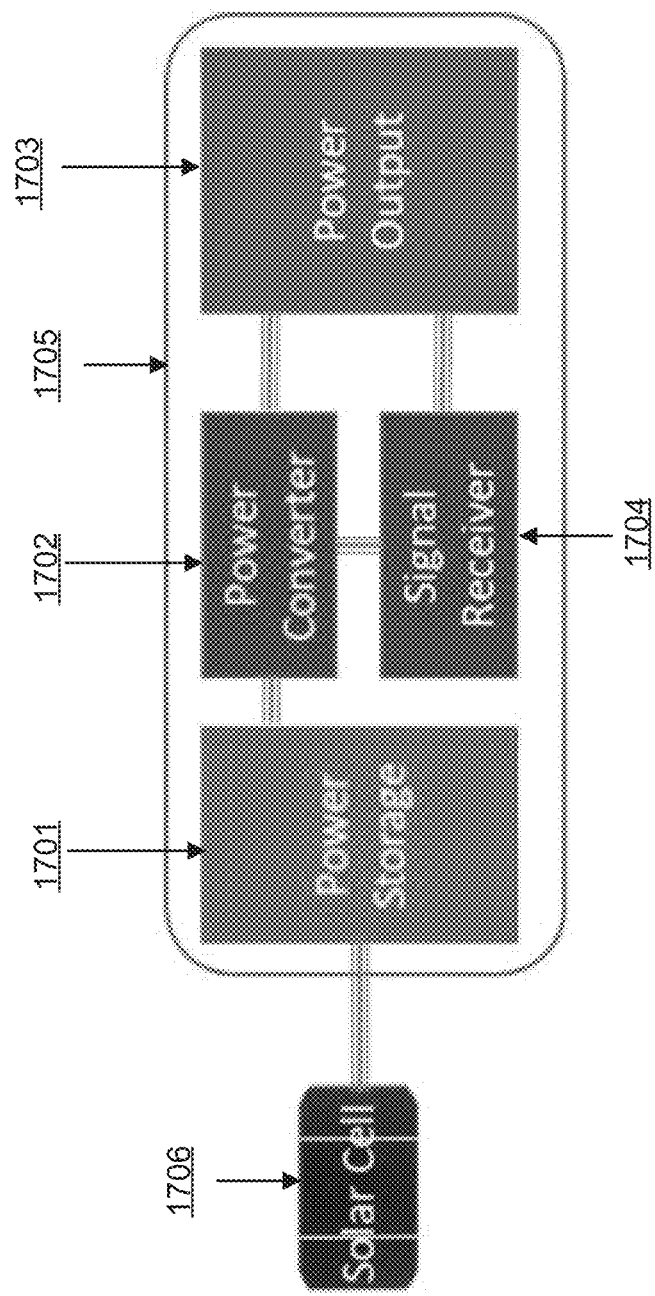
FIGS. 17-18 are diagrams illustrating a self-contained and self-powered controller powered by an energy generator such as a solar cell.
Figure 18:
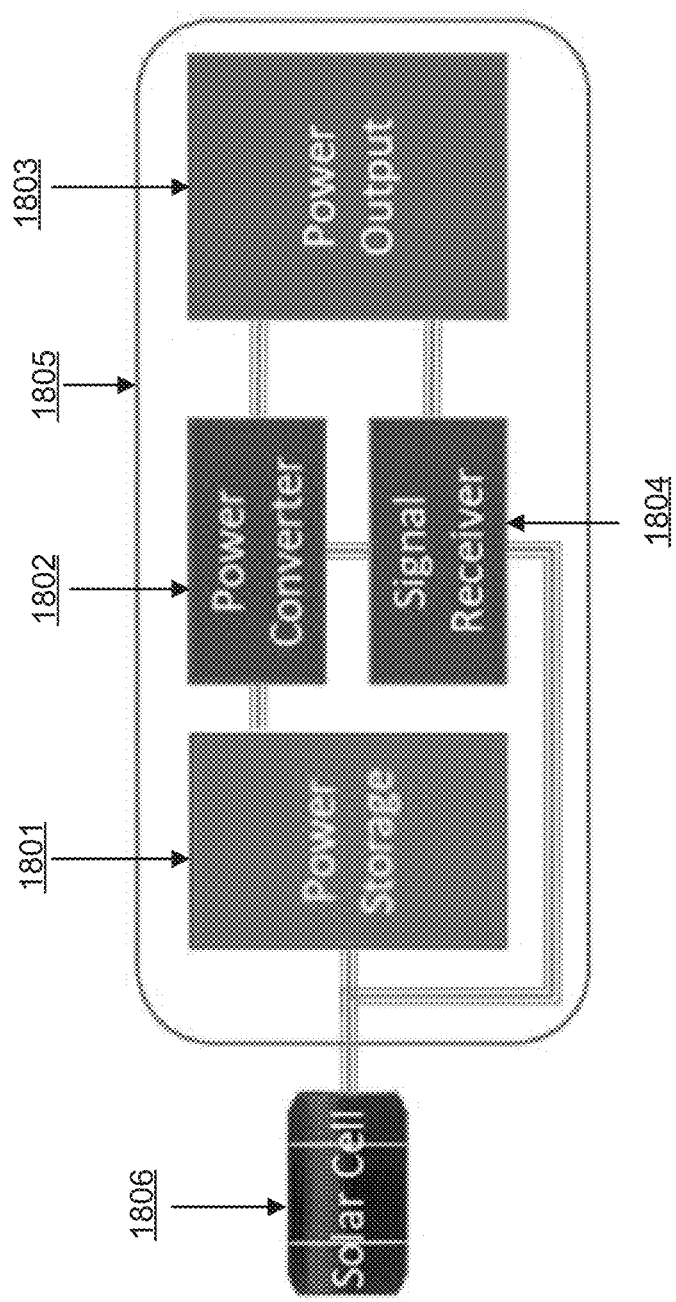

FIGS. 17-18 are diagrams illustrating a self-contained and self-powered controller powered by an energy generator such as a solar cell. In FIG. 17, an energy generator, such as a solar cell 1706, may supply power to the controller 1705. The solar cell 1706 may be implemented as the solar cell 1606 of FIG. 16. The controller 1705 may be implemented as the controller 1605 of FIG. 16. As shown in FIG. 17, the controller 1705 may include a power storage unit 1701, a power converter 1702, a power output control 1703, and a signal receiver 1704. The power storage unit 1701 may be a battery or a capacitor. The power converter 1702 may convert input power from the power storage unit 1701 to a power required by or usable by the signal receiver 1704 and the power output control 1703. Thus, in some embodiments, the power output control 1703 and the signal receiver 1704 may receive power indirectly from the solar cell 1706. An amount of power received by the power output control 1703 and the signal receiver 1704 may not completely depend upon an amount of light captured by the solar cell 1706. The power output control 1703 may be configured to supply power to an electrochromic device such as the electrochromic device 1600, for example, in response to information from the signal receiver 1704. The signal receiver 1704 may be configured to receive information of or signals indicating detected light intensity, level of transmission of the electrochromic device, and/or a color of the electrochromic device. The power output control may be configured to supply power in an amount based on the information of or the signals received from the signal receiver 1704, similar to mechanisms implemented in FIG. 16. In some embodiments, an active light receiving portion of the solar cell 1706 faces toward a light source such as sunlight. In some embodiments, the solar cell 1706 may determine an incident angle of light that strikes an active light receiving portion of the solar cell 1706. The solar cell 1706 may adjust its orientation with respect to the light source to maximize an amount of light that strikes an active light receiving portion of the solar cell 1706, for example, when the incident angle of light is 90 degrees.

In FIG. 18, an energy generator, such as a solar cell 1806, may supply power to the controller 1805. The solar cell 1806 may be implemented as the solar cell 1606 of FIG. 16. In some embodiments, the solar cell 1806 may generate power while simultaneously determining a light intensity. In some embodiments, the solar cell 1806 may detect the light intensity based on an amount of current generated by the solar cell 1806. In some examples, the solar cell 1606 may detect the Light intensity based on a relationship between the current generated and the light intensity, and/or based on a predetermined relationship between the current generated and the light intensity. In some embodiments, the current generated by the solar cell linearly depends on the light intensity. In some examples, the solar cell 1806 may transmit information of or a signal indicating the light intensity to the controller 1805, specifically, to a signal receiver such as the signal receiver 1804, as described below.

The controller 1805 may be implemented as the controller 1605 of FIG. 16. As shown in FIG. 18, the controller 1805 may include a power storage unit 1801, a power converter 1802, a power output control 1803, and a signal receiver 1804. The power storage unit 1801 may be a battery or a capacitor to receive stored electric power from the solar cell 1806, simultaneously with the solar cell 1806 transmitting information of or a signal indicating the light intensity to the signal receiver 1804. The power converter 1802 may convert input power from the power storage unit 1801 to a power required by or usable by the signal receiver 1804 and the power output control 1803. Thus, in some embodiments, the power output control 1803 and the signal receiver 1804 may receive power indirectly from the solar cell 1806. An amount of power received by the power output control 1803 and the signal receiver 1804 may not completely depend upon an amount of light captured by the solar cell 1806. The power output control 1803 may be configured to supply power to an electrochromic device such as the electrochromic device 1600, for example, in response to information from the signal receiver 1804. The signal receiver 1804 may be configured to receive information of or signals indicating detected light intensity, level of transmission of the electrochromic device, and/or a color of the electrochromic device. In some embodiments, the signal receiver 1804 determines an amount of power to be supplied to the electrochromic device based on the current generated by the solar cell 1806 or a current density transmitted from the solar cell 1806 to the signal receiver 1804. In some embodiments, the signal receiver 1804 may transmit the determined amount of power to the power output control 1805. The power output control 1805 may be configured to supply power in an amount based on the information of or the signals received from the signal receiver 1804, similar to mechanisms implemented in FIG. 16. In some embodiments, an active light receiving portion of the solar cell 1806 faces toward a light source such as sunlight. In some embodiments, the solar cell 1806 may determine an incident angle of light that strikes an active light receiving portion of the solar cell 1806. The solar cell 1806 may adjust its orientation with respect to the light source to maximize an amount of light that strikes an active light receiving portion of the solar cell 1806, for example, when the incident angle of light is 90 degrees.

In this disclosure, we present methods of changing optical states of electrochromic materials with constant voltage driving and constant current driving. It should also be well understood that a combination of voltage driving and current driving, pulsed voltage driving and current driving, combination of pulsed and DC driving, etc. can also be employed to change electrochromic materials to a desired optical state. As long as a certain amount of charges is injected into or extracted from an electrochromic material, the optical state of the electrochromic material can be adjusted accordingly.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of changing an optical state of an electrochromic film in an electrochromic device, comprising:
   determining a color of the electrochromic film;
   determining an amount of adjustment to be applied to the color, wherein the determination of the amount of adjustment comprises determining a difference between the color and a target color of the electrochromic film; and
   in response to determining that the difference is greater than the threshold amount, injecting or removing an amount of electric charges into or from the electrochromic film until the difference is less than the threshold amount.

2. The method of claim 1, wherein the target color is a color of an electrochromic film in another electrochromic device in a same room, house, building, or dwelling.

3. The method of claim 2, wherein the target color is preset to be a same color for all electrochromic films in other electrochromic devices in a same room, house, building, or dwelling.

4. The method of claim 1, wherein the target color is a color of the electrochromic film when the electrochromic film is in a dark state and an undegraded state.

5. The method of claim 1, wherein the target color is a color of the electrochromic film when the electrochromic film is in a light state and an undegraded state.

6. The method of claim 1, wherein the controlling an amount of electric charges injected into and removed from the electrochromic film comprises injecting or removing an amount of electric charges determined to obtain the target color of the electrochromic film.

7. The method of claim 1, wherein the determining a color of the electrochromic film comprises:
   determining a transmittance state of the electrochromic film; and
   determining the color of the electrochromic film based on the determined transmittance state, and based on a relationship between the transmittance state and the color of the electrochromic film.

8. The method of claim 7, wherein the determining an amount of adjustment to be applied to the color further comprises:
   determining the amount of adjustment to be applied to the color based on a rate of change of the color relative to a change in the transmittance state.

9. The method of claim 1, wherein the controlling an amount of electric charges injected into and removed from the electrochromic film comprises applying an external DC voltage to the electrochromic film.

10. The method of claim 1, wherein the controlling an amount of electric charges injected into and removed from the electrochromic film comprises applying an external DC current to the electrochromic film.

11. The method of claim 1, wherein the controlling an amount of electric charges injected into and removed from the electrochromic film comprises applying an external pulsed voltage to the electrochromic film.

12. The method of claim 1, wherein the controlling an amount of electric charges injected into and removed from the electrochromic film comprises applying an external pulsed current to the electrochromic film.

13. The method of claim 1, wherein the color of the electrochromic film comprises one or more of a reflected color and a transmitted color.

14. The method of claim 1, further comprising directly preinstalling the electrochromic device into a window frame.

15. A method of changing an optical state of an electrochromic film in an electrochromic device, comprising:
   detecting a light intensity of external light, wherein the detecting of the light intensity comprises:
      simultaneously determining an amount of current generated during a process of providing a power to the electrochromic device; and
      detecting the light intensity based on a linear relationship between the light intensity and the amount of current generated; and
   adjusting a level of transmission of the electrochromic film based on the detected light intensity or a change in the detected light intensity.

16. A electrochromic device comprising:
   one or more layers of glass;
   one or more adhesive layers;
   an electrochromic film; and
   a controller configured to:
      detect a light intensity of external light, wherein the detecting of the light intensity comprises:
         simultaneously determining an amount of current generated during a process of providing a power to the electrochromic device; and
         detecting the light intensity based on a linear relationship between the light intensity and the amount of current generated; and
      adjust a level of transmission of the electrochromic film based on the detected light intensity or a change in the detected light intensity.

* * * * *